US008362889B2

(12) United States Patent
Komori

(10) Patent No.: US 8,362,889 B2
(45) Date of Patent: Jan. 29, 2013

(54) ROAD CONDITION DETECTING SYSTEM

(75) Inventor: Terumoto Komori, Suntoh-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 728 days.

(21) Appl. No.: 12/449,762

(22) PCT Filed: Mar. 12, 2008

(86) PCT No.: PCT/IB2008/000982
§ 371 (c)(1), (2), (4) Date: Aug. 25, 2009

(87) PCT Pub. No.: WO2008/110926
PCT Pub. Date: Sep. 18, 2008

(65) Prior Publication Data

US 2010/0099353 A1 Apr. 22, 2010

(30) Foreign Application Priority Data

Mar. 12, 2007 (JP) ................................ 2007-062485

(51) Int. Cl.
*G08G 1/16* (2006.01)
*B60W 30/08* (2006.01)

(52) U.S. Cl. ........ 340/435; 340/436; 340/903; 701/301; 701/45; 701/117

(58) Field of Classification Search .................. 340/435, 340/436, 903; 701/300, 301, 45, 117
See application file for complete search history.

(56) References Cited

U.S. PATENT DOCUMENTS 6,615,137 B2 * 9/2003 Lutter et al. .................. 701/301
6,856,896 B2 * 2/2005 Kushida et al. ............... 701/470
2005/0231340 A1 * 10/2005 Tauchi .......................... 340/435

FOREIGN PATENT DOCUMENTS

EP 0 810 803 A2 12/1997
EP 1 865 479 A1 12/2007
FR 2 896 594 A1 7/2007
JP A-11-053690 2/1999
JP A-2004-077281 3/2004
JP A-2004-310558 11/2004

(Continued)

OTHER PUBLICATIONS

Tischler, “Enhanced Environmental Perception by Inter-Vehicle Data Exchange,” Intelligent Vehicles Symposium, 2005, pp. 313-318.

(Continued)

*Primary Examiner* — George Bugg
*Assistant Examiner* — Anne Lai
(74) *Attorney, Agent, or Firm* — Oliff & Berridge, PLC

(57) ABSTRACT

In a road condition detecting system consisting of a transmitter provided in a sending-side object on a road and adapted to transmit information about road conditions and a receiver provided in a receiving-side object on the road and adapted to receive information about road conditions, the transmitter includes sending-side vicinity information obtaining means for obtaining information about the vicinity of the sending-side object, transmitted information determining means for determining information to be transmitted, from the obtained vicinity information, and transmitting means for transmitting the determined vicinity information, and the receiver includes receiving means for receiving the vicinity information transmitted from the transmitting means of the transmitter.

20 Claims, 16 Drawing Sheets

FOREIGN PATENT DOCUMENTS

| | | |
|---|---|---|
| JP | A-2005-050187 | 2/2005 |
| JP | A-2005-115637 | 4/2005 |
| JP | A-2005-141324 | 6/2005 |
| JP | A-2005-207943 | 8/2005 |
| JP | A-2005-242526 | 9/2005 |
| JP | A-2005-297955 | 10/2005 |
| JP | A-2005-301581 | 10/2005 |
| WO | WO 03/001474 A2 | 1/2003 |

OTHER PUBLICATIONS

Office Action issued in corresponding Korean Patent Application No. 2009-7019000 dated Feb. 10, 2011 (with translation).

* cited by examiner

ROAD CONDITION DETECTING SYSTEM

BACKGROUND OF THE INVENTION

1. Field of the Invention

The invention relates to a road condition detecting system that obtains information about road conditions via vehicle-to-vehicle communications.

2. Description of the Related Art

Various systems for preventing collisions or alleviating or absorbing shock at the time of collisions have been developed. It is important for this type of system to detect obstacles, such as other vehicles or pedestrians, which exist in the vicinity of the own vehicle. To this end, the vehicle is installed with a camera or a radar sensor, and is arranged to detect obstacles by using image information or radar information. However, the own vehicle's ability to detect obstacles is limited by one or more factors, such as the range of detection of the sensor or a blind spot that cannot be seen from the own vehicle. Thus, some vehicles in the system utilize vehicle-to-vehicle communications, or the like, so as to obtain information about obstacles from other vehicles and so forth. For example, a system as disclosed in Japanese Patent Application Publication No. 2005-207943 obtains information on the position of another vehicle via vehicle-to-vehicle communications, and, if it is determined from map data and the information on the position of the vehicle (other than the own vehicle) that there is a structure or object that puts the vehicle out of view, the system provide a translucent or transparent image of the structure that puts the vehicle out of view on a three-dimensional map so as to allow the vehicle to be recognized.

However, not all the vehicles are installed with communication devices for conducting vehicle-to-vehicle communications, and pedestrians, and the like, do not carry such communication devices. Therefore, the above-described system obtains only the information on the positions of other vehicles equipped with such communication devices, and is not able to obtain information on the positions of pedestrians or other vehicles (e.g., vehicles that are not equipped with communication devices). Also, since the system receives position information from all of the other vehicles equipped with the communication devices and located in the vicinity of the own vehicle, a large communication band may be required at intersections, or the like, having a large amount of traffic, or unnecessary information may be obtained from other vehicles having no chance of resulting in considerably inefficient communications.

SUMMARY OF THE INVENTION

The invention provides a road condition detecting system that obtains necessary information about road conditions via efficient communications.

A first aspect of the invention relates to a road condition detecting system having a transmitter provided in a sending-side object on a road and adapted to transmit information about road conditions, and a receiver provided in a receiving-side object on the road and adapted to receive information about road conditions. The transmitter includes sending-side vicinity information obtaining means for obtaining information about the vicinity of the sending-side object, transmitted information determining means for determining information to be transmitted, from the vicinity information obtained by the sending-side vicinity information obtaining means, and transmitting means for transmitting the vicinity information determined by the transmitted information determining means. The receiver includes receiving means for receiving the vicinity information transmitted from the transmitting means of the transmitter.

In the road condition detecting system as described above, the transmitter is provided in the sending-side object, such as a vehicle, while the receiver is provided in the receiving-side object, such as a vehicle, and the transmitter and the receiver communicate with each other so that the receiving-side object obtains information about road conditions from the sending-side object. In the transmitter, the sending-side vicinity information obtaining means obtains information (vicinity information) about road conditions in the vicinity of the sending-side object. The vicinity information thus obtained may include information about road conditions needed by the receiving-side object (for example, information that cannot be obtained at the receiving-side object due to a blind spot, or the like, or information on an object having a possibility of colliding with the receiving-side object). In the transmitter, therefore, the transmitted information determining means determines or selects information to be transmitted to the receiving-side object, from the obtained vicinity information, and the transmitting means transmits the vicinity information determined to be transmitted, to the receiver of the receiving-side object. In the receiver, the receiving means receives the vicinity information transmitted from the transmitter. Thus, in the road condition detecting system, the transmitter selects information to be transmitted (i.e., information needed by the receiving-side object) from the obtained information about road conditions, and transmits the selected information, so that only the information about road conditions needed at the receiving end can be transmitted. Consequently, the receiver is able to obtain only the necessary information, and the amount of traffic in the communications between the transmitter and the receiver can be reduced so that the otherwise possible expansion of the communication band can be avoided or restricted.

In the road condition detecting system according to the first aspect of the invention, the transmitted information determining means may include receiving-side information obtaining means for obtaining information about the receiving-side object, and may determine the information to be transmitted, based on the information about the receiving-side object.

The receiving-side information obtaining means obtains information about the receiving-side object, and the transmitted information determining means determines information to be transmitted, from the obtained vicinity information, based on the information about the receiving-side object (e.g., information on the position of the receiving-side object). In this road condition detecting system, the transmitter selects the information to be transmitted, based on the information about the receiving-side object. Therefore, the information about road conditions needed at the receiving end can be efficiently selected and transmitted, and the receiver can obtain only the necessary information.

In the road condition detecting system as described above, the transmitted information determining means may obtain information about the receiving-side object, based on the vicinity information obtained by the sending-side vicinity information obtaining means. In this case, the information about the receiving-side object, which is obtained by the receiving-side information obtaining means, may be referred to as "first receiving-side object information", and the information about the receiving-side object, which is obtained based on vicinity information obtained by the sending-side vicinity information obtaining means, may be referred to as "second receiving-side object information".

The above-indicated transmitted information determining means obtains the information about the receiving-side object, based on the vicinity information (such as information on the position of the receiving-side object) obtained by the sending-side vicinity information obtaining means. Thus, in the road condition detecting system, the transmitter obtains the information about the receiving-side object through the means provided in itself (the transmitter), and thus need not obtain information about the receiving-side object from the receiver via communications.

In the road condition detecting system as described above, the receiver may include region request transmitting means for transmitting a region request that designates a region on which information is needed, and the receiving-side information obtaining means may obtain the information about the receiving-side object from the region request transmitted from the region request transmitting means.

In the receiver as described just above, the region request transmitting means transmits a region request that specifies a region with respect to which information about road conditions is needed. In the transmitter, the receiving-side information obtaining means obtains the region (receiving-side object information) on which information is needed, from the region request transmitted from the receiver, and the transmitted information determining means determines information to be transmitted, from the obtained vicinity information, based on the region on which information is needed. Thus, in the above-described road condition detecting system, the receiver designates a region on which information is needed, and the transmitter selects information to be transmitted, based on the region on which information is needed, so that the transmitter can surely select and transmit the information about road conditions needed at the receiving end, and the receiver can surely obtain the necessary information.

In the road condition detecting system as described above, the transmitter may include first region obtaining means for obtaining a first region on which information can be obtained by the transmitter, and second region obtaining means for obtaining a second region on which information can be obtained by the receiver, and the transmitted information determining means may determine vicinity information on a region that is included in the first region on which information can be obtained by the transmitter but not included in the second region on which information can be obtained by the receiver, as the information to be transmitted.

In the transmitter as described just above, the first region obtaining means obtains information about a region (first region) with respect to which information (vicinity information) about road conditions in the vicinity of the sending-side object can be obtained by the transmitter, and the second region obtaining means obtains a region (second region) with respect to which information about road conditions in the vicinity of the sending-side object can be obtained by the receiver. Then, the transmitter causes the transmitted information determining means to determine vicinity information on a region that is included in the first region on which information can be obtained by the transmitter but not included in the second region on which information can be obtained by the receiver, as information to be transmitted, and causes the transmitting means to send the vicinity information determined to be transmitted. Thus, in the road condition detecting system, the vicinity information on the region other than the region on which information about road conditions is obtained at the receiving end is selected as information to be transmitted, so that only the information about road conditions in the region on which information is needed at the receiving end (namely, the region on which information cannot be obtained at the receiving end) can be transmitted from the transmitter to the receiver.

In the road condition detecting system as described above, the receiver may include receiving-side vicinity information obtaining means for obtaining information about the vicinity of the receiving-side object, reliability obtaining means for respectively obtaining the reliability of the information about the vicinity of the receiving-side object which is obtained by the receiving-side vicinity information obtaining means and the reliability of information about the vicinity of the sending-side object which the receiving means receives, and received information determining means for determining whether the information about the vicinity of the sending-side object which the receiving means receives is to be employed. In this system, the received information determining means may compare the reliability of the information about the vicinity of the receiving-side object, which is obtained by the reliability obtaining means, with the reliability of the information about the vicinity of the sending-side object, which is obtained by the reliability obtaining means, and may employ the vicinity information having the higher reliability.

In the receiver as described just above, the receiving-side vicinity information obtaining means obtains the information about the vicinity of the receiving-side object. Then, the reliability obtaining means of the receiver obtains the reliability of the vicinity information obtained at the receiving end (the receiver) and the reliability of the vicinity information obtained at the sending end (the transmitter). Then, the received information determining means of the receiver compares the reliability of the vicinity information obtained at the receiving end with the reliability of the vicinity information obtained at the sending end, and employs the vicinity information having the higher reliability. Thus, in the road condition detecting system; the information having the higher reliability, selected from the information obtained at the receiving end and the information obtained at the sending end, is used as the information about road conditions, and therefore the receiver is able to obtain highly accurate information.

In the road condition detecting system as described above, the receiver may include receiving-side vicinity information obtaining means for obtaining information about the vicinity of the receiving-side object, and received information determining means for determining whether information about the vicinity of the sending-side object which the receiver receives is employed. When a degree of discrepancy between given information included in the information about the vicinity of the receiving-side object which is obtained by the receiving-side vicinity information obtaining means and given information included in the information about the vicinity of the sending-side object which the receiving means receives is equal to or larger than a threshold value, the received information determining means may abandon the given information received by the receiving means.

In the receiver as described just above, the receiving-side vicinity information obtaining means obtains information about the vicinity of the receiving-side object. If a discrepancy or difference between given information (such as information on the position of an obstacle) included in the vicinity information obtained at the receiving end (receiver), and corresponding information included in the vicinity information obtained at the sending end (transmitter), is equal to or larger than the threshold value, the given information obtained at the sending end (transmitter) is abandoned. Thus, in the road condition detecting system, the sending-side information is abandoned if it is determined based on the receiving-side information obtained by the receiver itself that the sending-side information has a low reliability, and therefore the sending-side information is prevented from being erroneously employed or used.

In the system of the invention in which the transmitter obtains information about road conditions, and selects and transmits information to be transmitted, the receiver is able to obtain only the necessary information about road conditions, and efficient communications can be carried out between the transmitter and the receiver.

BRIEF DESCRIPTION OF THE DRAWINGS

The foregoing and further objects, features and advantages of the invention will become apparent from the following description of embodiments with reference to the accompanying drawings, wherein like numerals are used to represent like elements, and wherein.

DETAILED DESCRIPTION OF THE EMBODIMENTS

Some embodiments of road condition detecting systems of the invention will be described with reference to the accompanying drawings.

In each of the embodiments, the invention is applied to a road condition detecting system adapted to obtain information about obstacles, such as other vehicles (four-wheel vehicles, two-wheel vehicles), bicycles and pedestrians, via vehicle-to-vehicle communications. The road condition detecting system of each of the embodiments consists principally of a vehicle on which at least a receiver is installed so as to obtain obstacle information, and a vehicle on which at least a transmitter is installed so as to provide obstacle information. Of the embodiments as described below, a first embodiment is concerned with the basic configuration of the system, and a second embodiment is concerned with the manner of determining or evaluating the correctness (or accuracy) of obstacle information obtained by the receiver, while a third embodiment is concerned with the manner of determining the reliability of the obstacle information obtained by the receiver, or the reliability of a sensor or sensors of the transmitter.

Figure 1:
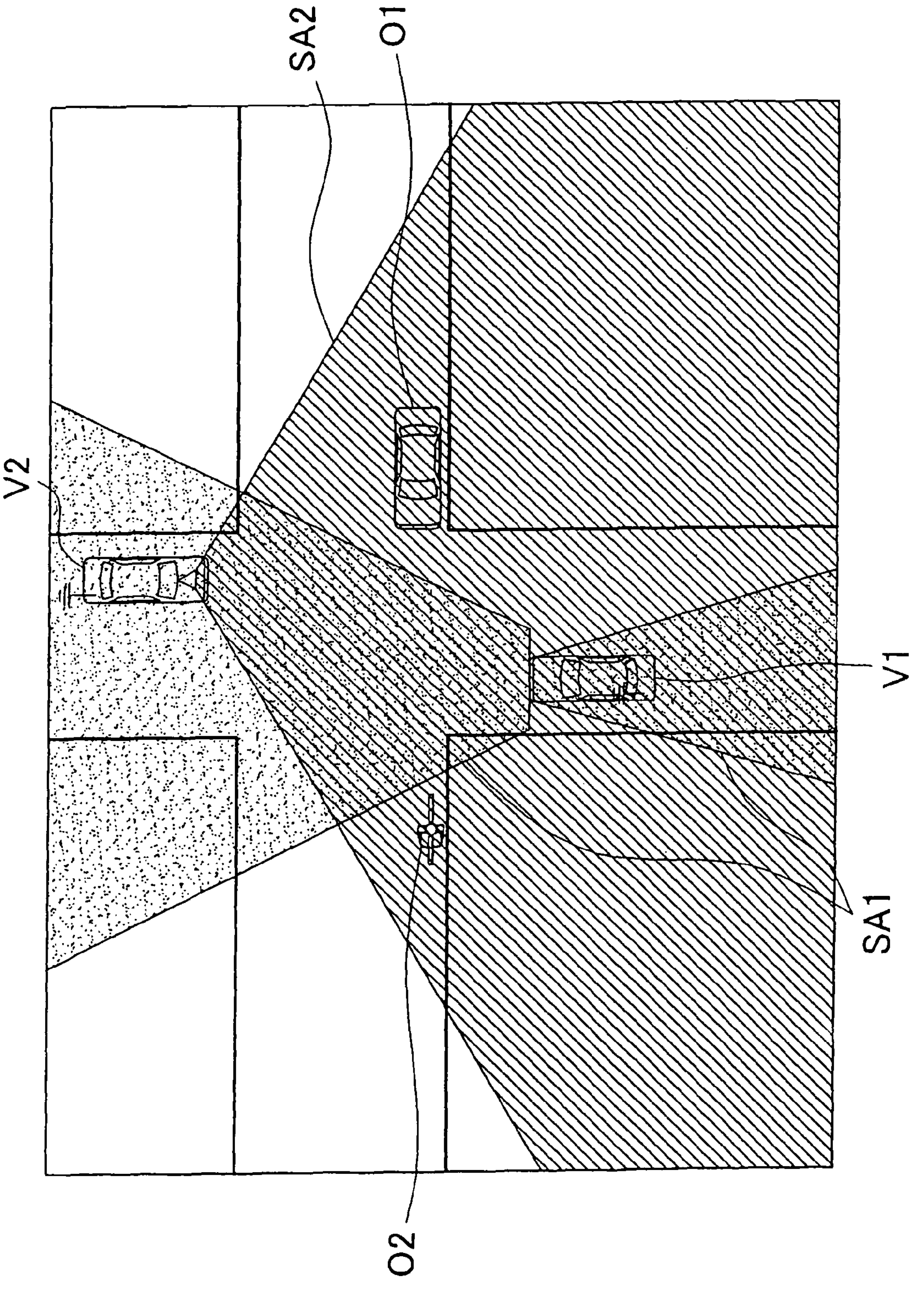
FIG. 1 is a view showing an example of road condition detecting system constructed according to the invention.

FIG. 1 shows one example of road condition detecting system. In FIG. 1, symbol "V1" designates a receiving-side vehicle that obtains or receives obstacle information from a vehicle V2, and the above-indicated receiver is installed on the vehicle V1. The vehicle V1 may or may not be equipped with a sensor for detecting obstacles. The vehicle V1 has a region SA1 in which obstacles can be visually identified by the driver or detected by the sensor, if any. The vehicle V2 is a sending-side vehicle that provides obstacle information, and at least the transmitter is installed on the vehicle V2. The vehicle V2 is equipped with a sensor for detecting obstacles, and has a region SA2 in which obstacles can be detected by the sensor. In the example shown in FIG. 1, vehicle O1 and bicycle O2 are regarded as obstacles. The vehicle O1 and bicycle O2 do not exist in the region SA1 in which the vehicle V1 can sense obstacles, but exist in the region SA2 in which the vehicle V2 can sense obstacles. Thus, the vehicle V2 can provide the vehicle V1 with the information on these obstacles.

Transmission and reception of information, more specifically, transmission of a designated region and a request for obstacle information, may be carried out all the time, or only at intersections or other locations where the visibility is low. The vehicles that constitute the road condition detecting system may include vehicles installed solely with receivers (vehicles that obtain obstacle information), vehicles installed solely with transmitters (vehicles that provide obstacle information), and vehicles installed with receivers and transmitters (vehicles that obtain and provide obstacle information). The receivers and transmitters are not necessarily installed on all of the vehicles, but communications are conducted only between the vehicles installed with the receivers and/or the transmitters.

Figure 2:
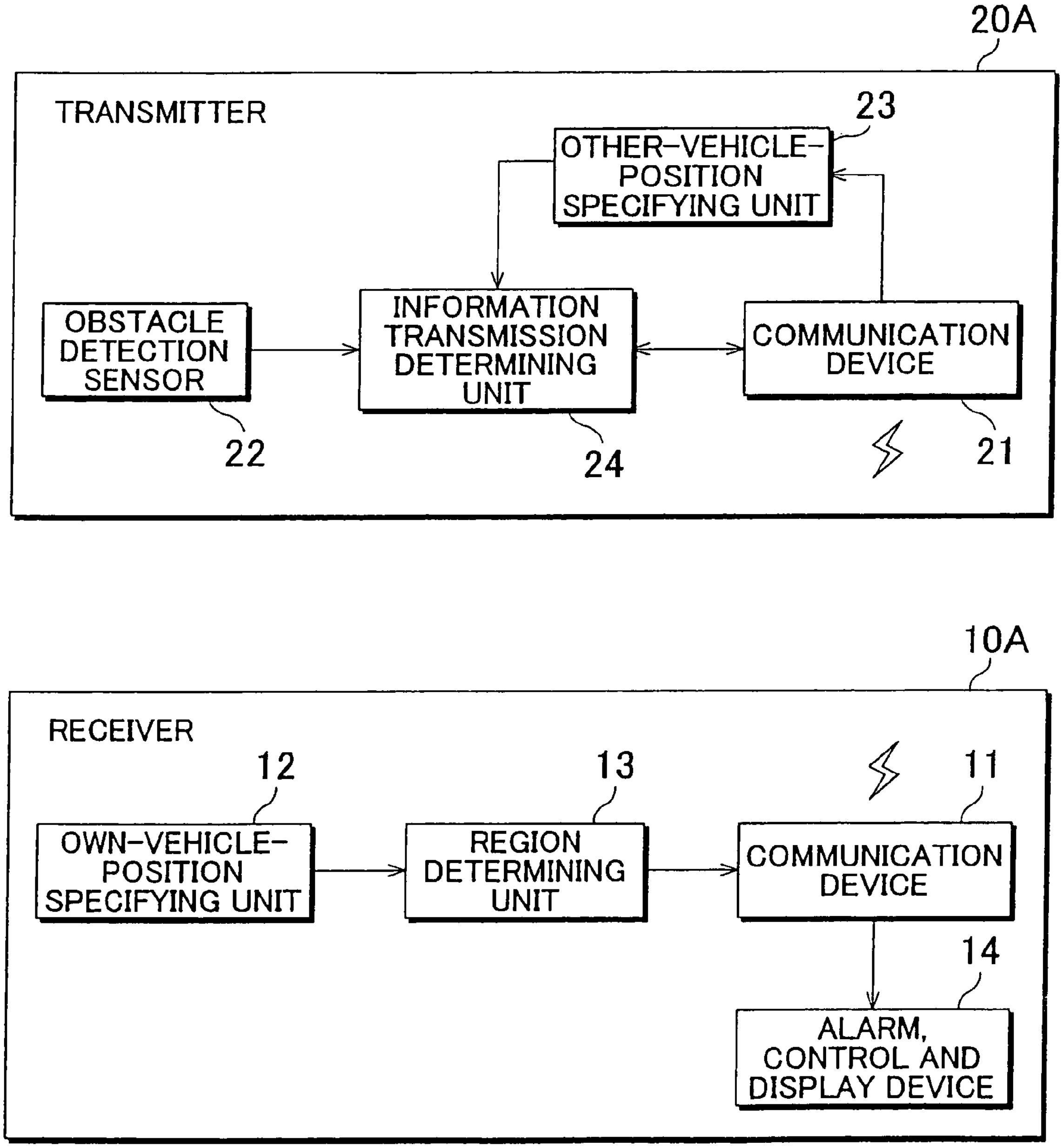
FIG. 2 is a view showing the construction of receiver and transmitter of a road condition detecting system according to a first embodiment of the invention.
Figure 3:
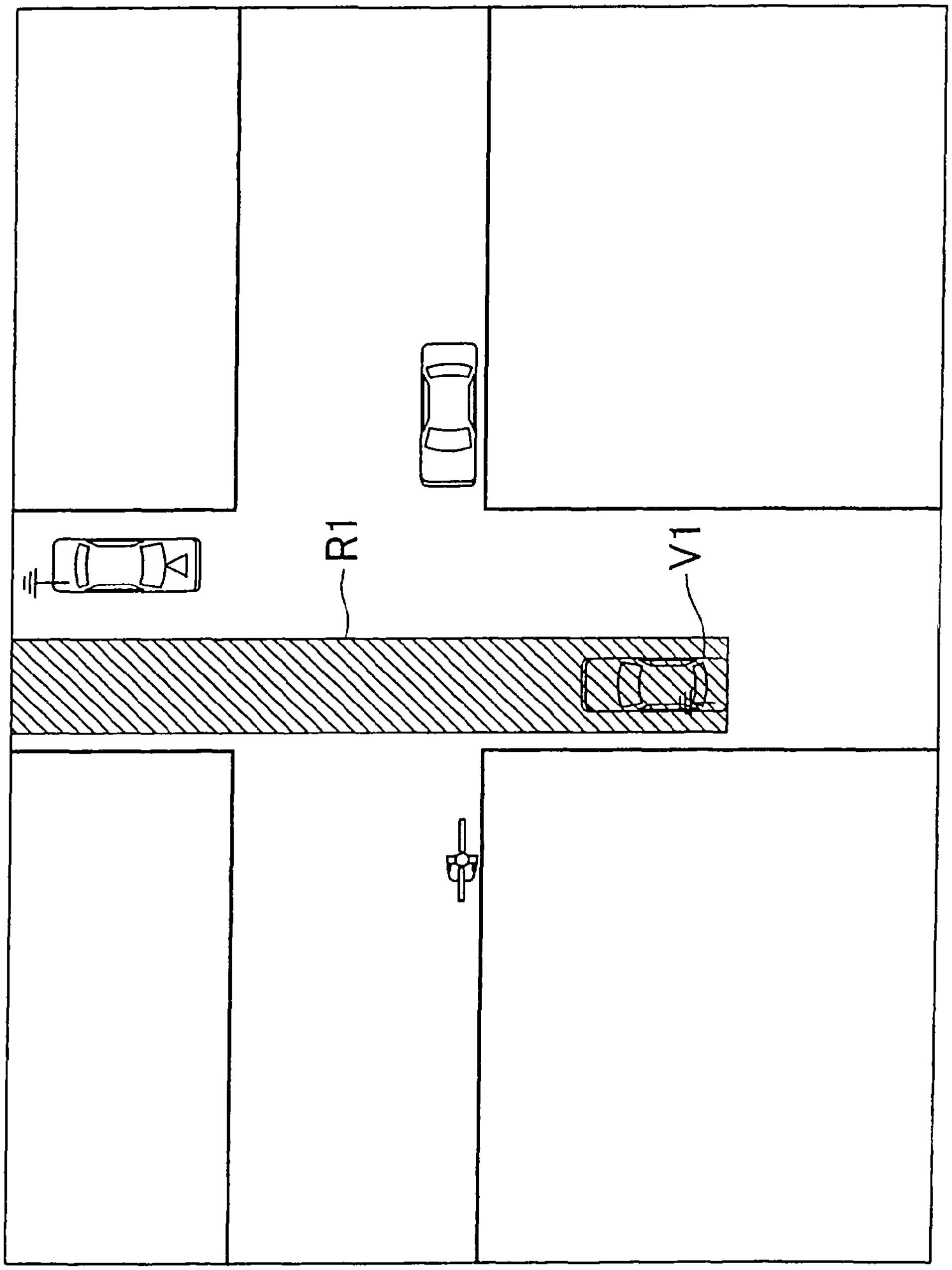
FIG. 3 is a view showing an example of expected traveling region used for determining a designated region in the embodiment of FIG. 2.
Figure 4:
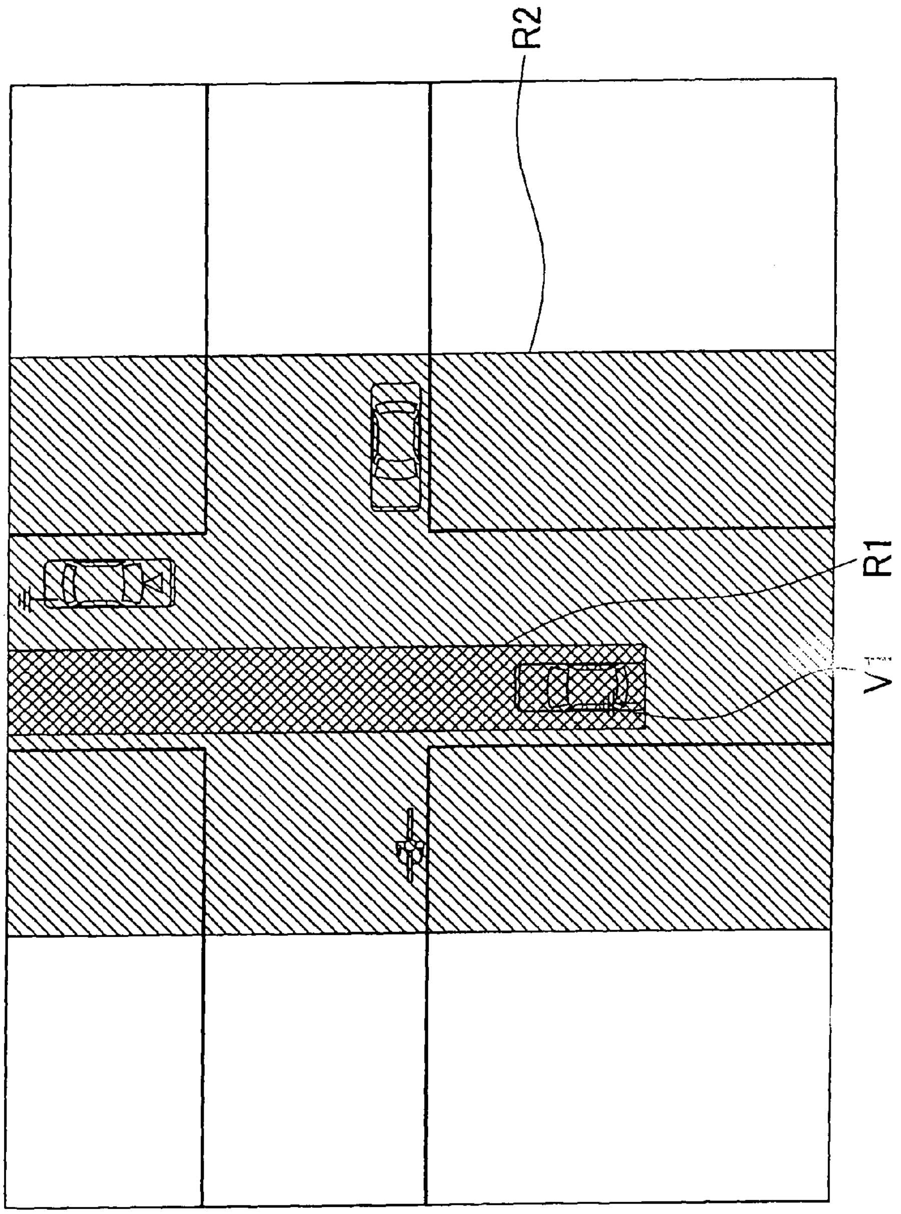
FIG. 4 is a view showing an example of region in which an obstacle or obstacles may exist, which region is used for determining the designated region in the embodiment of FIG. 2.
Figure 5:
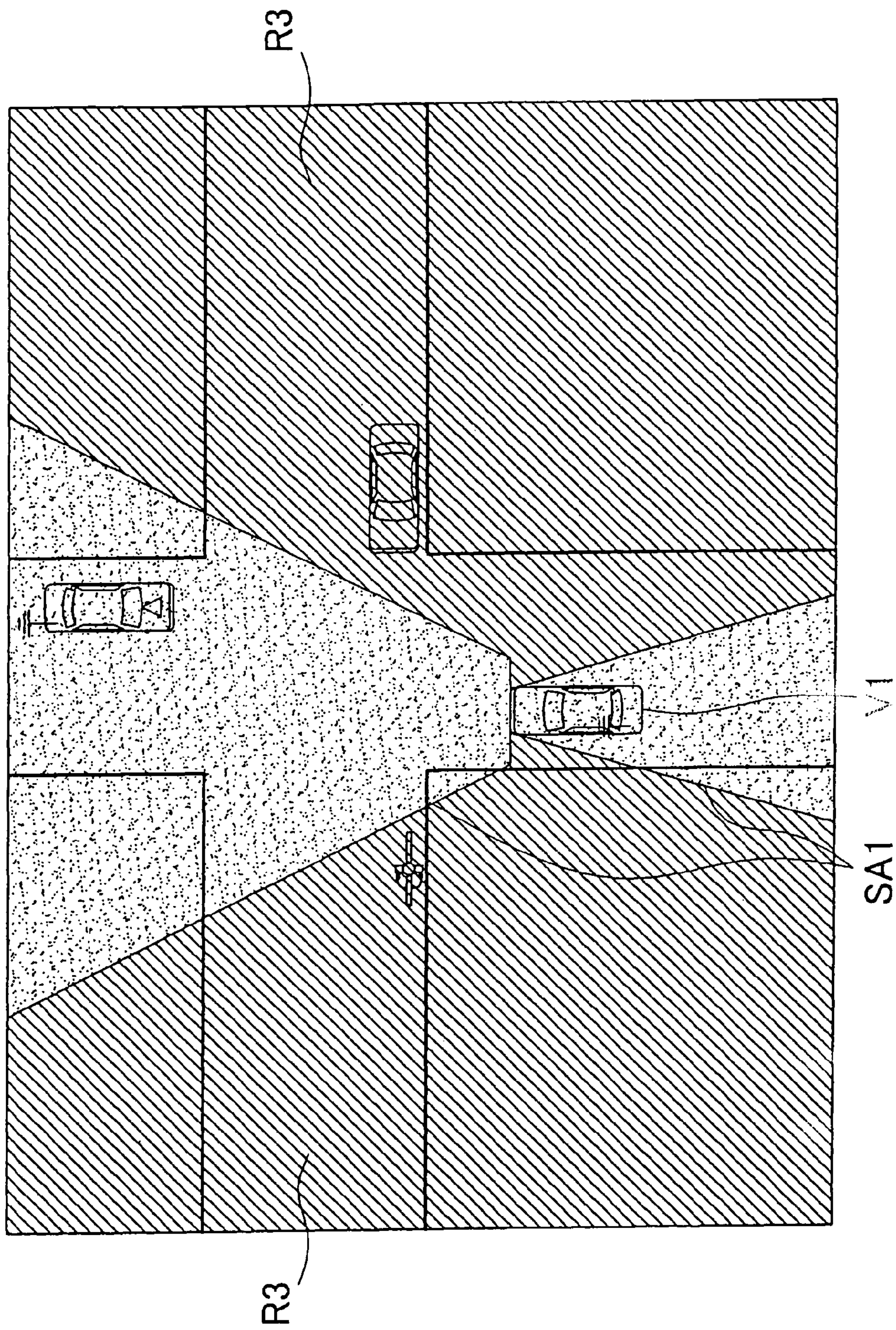
FIG. 5 is a view showing an example of out-of-sight region used for determining the designated region in the embodiment of FIG. 2.

Referring to FIG. 1 through FIG. 5, the road condition detecting system according to the first embodiment of the invention will be explained. FIG. 1 generally shows the road condition detecting system of this embodiment. FIG. 2 shows the construction of receiver and transmitter of the road condition detecting system according to the first embodiment. FIG. 3 shows an example of expected traveling region used for determining a designated region as described later in connection with the present embodiment. FIG. 4 shows an example of region in which an obstacle or obstacles may exist, which region is used for determining the designated region of this embodiment. FIG. 5 shows an example of out-of-sight region used for determining the designated region of this embodiment.

The road condition detecting system of the first embodiment consists of one or more receivers 10A installed on at least one vehicle V1, and one or more transmitters 20A installed on at least one vehicle V2, and vehicle-to-vehicle communications are conducted between the receiver(s) 10A and the transmitter(s) 20A so as to obtain obstacle information. In the road condition detecting system of the first embodiment, in particular, the transmitter 20A only the information about obstacles in a region designated by the receiver 10A, so that the receiver 10A obtains only the necessary obstacle information, and the amount of traffic in the vehicle-to-vehicle communications can be reduced.

Initially, the receiver 10A will be explained. In order to assist the driver of the vehicle V1, the receiver 10A obtains obstacle information from at least another vehicle V2, and produces alarm output and display output and performs intervention control in accordance with the obstacle information. In particular, the receiver 10A sends the position of the own vehicle V1 and information as to the designated region to the transmitter 20A of the vehicle V2 so as to obtain only the obstacle information the own vehicle V1 needs. To this end, the receiver 10A includes a communication device 11, a own-vehicle-position specifying unit 12 that creates information that specifies the position of the own vehicle, a region determining unit 13 that determines a region for which information is to be obtained, and an alarm, control and display device 14. In the first embodiment, the communication device 11 may be regarded as the above-mentioned receiving means of the receiver, and the region determining unit 13 and the communication device 11 may be regarded as the above-mentioned region request sending means.

The communication device 11 serves to send and receive various types of information, and includes an antenna, a transmitting portion and a receiving portion. The antenna, which serves as a transmitting and receiving antenna, sends and receives various signals. The antenna is a nondirectional antenna that receives signals from all directions, and sends signals in all directions. For transmission of information, the transmitting portion modulates data to be transmitted into a transmission signal, and the transmission signal is sent from the antenna. For reception of information, the antenna receives a signal, and the receiving portion demodulates the received signal to provide received data.

The own-vehicle-position specifying unit 12 specifies the absolute position ${}^{W}P_1$ of the own vehicle V1, using various information, and outputs the absolute position ${}^{W}P_1$ to the communication device 11 as a piece of data to be transmitted. As an example of specifying the position, the receiver 10A receives GPS information from a GPS satellite, and the specifying unit 12 calculates the absolute position from the GPS information. In another example, the receiver 10A receives VICS information from a beacon, and the specifying unit 12 calculates the position of the own vehicle V1 relative to a reference position from the V1CS information, and calculates the absolute position from the relative position. In the symbol ${}^{W}P_1$, P indicates the position of the object in question, and superscript W indicates the object lies in the absolute coordinate system, and subscript 1 indicates that the position is that of the receiving-side vehicle V1.

The region determining unit 13 determines a region (designated region ${}^{W}R_1$) with respect to which the own vehicle V1 needs obstacle information. The region determining unit 13 creates a designated region transmission request that makes a request of the sending-side vehicle V2 for the transmission of information about obstacles existing in the designated region ${}^{W}R_1$, and outputs the designated region transmission request to the communication device 11 as data to be transmitted. The designated region may be determined on the basis of, for example, the expected traveling region R1 of the own vehicle V1 (see FIG. 3), region R2 in which an obstacle or obstacles may exist (see FIG. 4), and/or the out-of-sight region R3 (see FIG. 5). Namely, the region determining unit 13 sets the designated region ${}^{W}R_1$ based on one region selected from the above-indicated regions, or a combination of two or three (all) of these regions. The designated region ${}^{W}R_1$ may be represented by a single region, or two or more split regions. In the symbol ${}^{W}R_1$, R indicates the designated region, superscript W indicates that the region is defined in the absolute coordinate system, and subscript 1 indicates the receiving-side vehicle V1. The designated region ${}^{W}R_1$ may be expressed by, for example, a sequence of points (see the expression (9) as indicated below) that provides a closed curve.

The expected traveling region R1 is a region into which the own vehicle V1 is likely to travel. The expected traveling region R1 is determined by estimating the motion of the own vehicle V1 from the vehicle speed and the yaw rate. For example, assuming that the vehicle is running on a road having a constant radius of curvature if it travels over a somewhat short distance, the expected traveling region R1 after a lapse of time $t_1$ may be calculated as a region inside a line (curve or straight line) represented by the expression (1) below and a line represented by the expression (2) below, where $v_1$, $\omega_1$ and $W_1$ respectively represent the vehicle speed, yaw rate and width of the own vehicle V1.

$$f_1(t) = ((R+W_1)(\cos\omega_1 t_1) - R,\ (R+W_1)\sin\omega_1 t_1)^T \tag{1}$$

$$f_2(t) = ((R-W_1)(\cos\omega_1 t_1) - R,\ (R-W_1)\sin\omega_1 t_1)^T \tag{2}$$

where $$R = \frac{v_1}{\omega_1}$$

The vehicle V1 may make a request of the other vehicle V2 for transmission of the vehicle speed and yaw rate of the own vehicle V1, and obtain the vehicle speed and yaw rate from the other vehicle V2. Where the own vehicle V1 is equipped with a vehicle speed sensor and a yaw rate sensor or a GPS sensor, the own vehicle V1 may detect the vehicle speed and yaw rate by itself. In this case, the amount of traffic of data communicated between the vehicles can be reduced. In this connection, it is not necessary to strictly use measurement values of the vehicle speed and yaw rate, but the measurement values may be increased or reduced in view of errors, or the like. It is also possible to calculate the expected traveling region R1 from other motion-related information, such as the vehicle speed and the steering angle, or navigation information, instead of using the vehicle speed and the yaw rate.

The region R2 is a region in which an obstacle (such as a vehicle) that can enter the expected traveling region R1 exists. The region R2 is obtained as a set of positions $X_1''=(x_1'', y_1'')^T$ that satisfy the relationship represented by the expression (4) below, where $v_0$ is the maximum speed of the obstacle, and the expression (3) indicates a given position $X_1'(t)$ in the expected traveling region R1 of the vehicle V1, which the vehicle V1 is expected to reach after t seconds. The position $X_1''$ is a given position at which an obstacle that can enter the expected traveling region R1 exists. The maximum speed $v_0$ of the obstacle may be, for example, the speed limit for vehicles running on the road(s) in the vicinity of the vehicle V1, or the highest speed of vehicles that exist in the vicinity of the vehicle V1, or the highest speed at which vehicles are able to run.

$$X_1'(t)=(x_1'(t),y_1'(t))^T \tag{3}$$

$$(x_1''-x_1'(t))^2+(y_1''-y_1'(t))^2-(v_0t)^2 \leqq 0 \tag{4}$$

In the above manner, the region R2 in which an obstacle or obstacles may exist after $t_1$ seconds can be calculated as a set of positions $X_1''=(x_1'', y_1'')^T$ at which the above-indicated expression (4) holds in a period of time t between 0 and $t_1$. Here, it is assumed that there is no wall, or the like, that lies in a path of movement of the obstacle to restrict the movement, or no information about the presence of a wall, or the like, is available. If, however, there is a limit to the region over which the obstacle can move, the region R2 may be calculated as a set of positions at which the length of the path to a given position $X_1'(t)$ in the expected traveling region R1 is equal to or less than $v_0t$.

The out-of-sight region R3 may be a blind spot for the driver or a region outside the distance of the driver's vision, or a region outside a detection region of an obstacle detection sensor where the own vehicle V1 is equipped with the sensor. The out-of-sight region R3 is determined by, for example, the shape of the vehicle V1 where the region R3 is a blind spot for the driver, and is determined by the vision or eyesight of the driver where the region R3 is outside the distance of the driver's vision. In these cases, the blind spot for the driver of the vehicle V1 or the distance of the driver's vision may be obtained in advance. It is also possible to measure a watching pattern of the driver, or movements of the eyes of the driver, in advance, and register a region or regions located in directions in which the driver is less likely to watch, as the out-of-sight region(s). In another example, the type of the driver may be determined based on human characteristics, such as age and gender, and the out-of-sight region may be set based on data, such as blind spots or distances of vision, obtained through measurements for each type or model of the driver. In the case where the vehicle V1 is equipped with an obstacle detection sensor or sensors, the out-of-sight region R3 is determined by the range of detection of each obstacle detection sensor, which may be registered in advance.

The alarm, control and display device 14 obtains obstacle information as received data from the communication device 11 (i.e., receives obstacle information from the other vehicle V2), and produces alarm output and display output and performs intervention control based on the obstacle information. In the case where the vehicle V1 is equipped with an obstacle detection sensor, production of alarm output and display output and intervention control may be performed in view of obstacle information detected by the own vehicle V1 as well as the obstacle information received from the other vehicle V2. More specifically, the alarm, control and display device 14 calculates the position of an obstacle relative to the own vehicle V1, and determines whether the production of alarm output and display output and the intervention control are necessary, based on the relationship between the relative position and the traveling direction or vehicle speed of the own vehicle V1. If these outputs and control are deemed necessary, the alarm, control and display device 14 generates an audible alarm or a visible alarm on a display, or the like, so as, to inform the driver of the possibility of collision with the obstacle, and operates a brake system or a steering system under intervention control so as to prevent a collision with the obstacle or alleviate shock caused by a collision. When an outside-of-detection flag or a zero obstacle flag (which will be described later) is transmitted from the sending-side vehicle V2, the alarm, control and display device 14 provides an indication of impossibility on a display, or the like, so as to inform the driver of the impossibility of production of alarm and display outputs and intervention control. The alarm, control and display device 14 may perform all of the functions of alarm output, intervention control and display output, or may perform one or two of these three functions. The production of alarm output and display output and intervention control may be performed stepwise or selectively as the type of driving assist is varied depending on the likelihood of collision.

Next, the transmitter 20A will be explained. The transmitter 20A installed on the vehicle V2 is arranged to detect obstacles and provide obstacle information to the vehicle V1, so as to assist the driver of the vehicle V1. In particular, the transmitter 20A selects an obstacle or obstacles that exist in a region designated by the vehicle V1, from the detected obstacles, and transmits only the information on the selected obstacle(s) to the receiver 10A, so as to reduce the amount of traffic of data communicated. To this end, the transmitter 20A includes a communication device 21, an obstacle detection sensor 22, an other-vehicle-position specifying unit 23, and an information transmission determining unit 24. In the first embodiment, the communication device 21 may be regarded as the above-mentioned transmitting means of the transmitter, and the obstacle detection sensor may be regarded as the above-mentioned sending-side vicinity information obtaining means, while the information transmission determining unit 24 may be regarded as the above-mentioned transmitted information determining means, and the other-vehicle-position specifying unit 23 and communication device 21 may be regarded as the above-mentioned receiving-side information obtaining means.

The communication device 21 is similar to the communication device 11 of the receiver 10A.

The obstacle detection sensor 22 serves as a sensor for detecting obstacles. The obstacle detection sensor 22 determines whether an obstacle j exists in the vicinity of (e.g., ahead of) the sending-side vehicle V2, based on various information, and calculates the position ${}^2O_j$ of the obstacle j relative to the vehicle V2 when the obstacle j exists. The obstacle detection sensor 22 may be comprised of a radar sensor using laser beams, ultrasonic waves, or the like, and a processing unit for processing radar information, or may be comprised of a stereo camera and an image processing unit. In the symbol ${}^2O_j$, O indicates the position of the obstacle concerned, and superscript 2 indicates that the position is defined in a relative coordinate system of the vehicle V2, while subscript j indicates the number of the detected obstacle.

The other-vehicle-position specifying unit 23 specifies the position of the receiving-side vehicle V1. As an example of specifying the position, the other-vehicle-position specifying unit 23 specifies the position of the vehicle V1 based on the absolute position ${}^WP_1$ received by the communication device 21 from the receiving-side vehicle V1. In another example, the other-vehicle-position specifying unit 23 receives the color, shape, size and vehicle type of the vehicle V1, the intensity of reflection of laser light against the vehicle, and other information, from the vehicle V1, and recognizes the vehicle V1 in an image captured by a camera, based on these items of information, so as to calculate the position of the vehicle V1 based on the stereo image or radar information. In this case, the receiving-side vehicle V1 needs to transmit information, such as the color of the vehicle V1, instead of the absolute position ${}^WP_1$, to the vehicle V2.

In the case where two or more position specifying methods are available, the receiving-side vehicle V1 and the sending-side vehicle V2 may communicate with each other and determine which of the specifying methods is used for specifying the position of each vehicle. By mutually specifying the vehicle position in this manner, the system may be applied to moving objects (e.g., vehicles) of which the positional relationship changes constantly.

The information transmission determining unit 24 determines obstacle information to be transmitted, from the obstacle information detected by the obstacle detection sensor 22, according to a designated region transmission request received from the receiving-side vehicle V1. More specifically, the information transmission determining unit 24 calculates a relative position $^2P_1$ of the vehicle V1 in the relative coordinate system of the vehicle V2, from the absolute position $^WP_1$ of the receiving-side vehicle V1 specified by the other-vehicle-position specifying unit 23. For conversion in position, the relative position $^2P_1$ may be calculated according to the expression (5) below, where $^2P_W$ is a rotation matrix for rotation (conversion) from the absolute coordinate system to the relative coordinate system, and $-^WP_{2,k}$ is the amount of translational motion obtained from the absolute position $^WP_{2,k}$ of the vehicle V2 at the current time k and the absolute position $^WP_2$ at a previous point k−1 in time. In the case where the absolute coordinates of the vehicle V2 cannot be calculated using GPS, or the like, the current coordinate system of the vehicle V2 may be used as the absolute coordinates.

$$^2P_1={}^2R_W{}^WP_1-{}^WP_{2,k} \quad (5)$$

Next, the information transmission determining unit 24 sequentially calculates the distance $d_{1,j}$ between the relative position $^2O_j$ of each obstacle j detected by the obstacle detection sensor 22 and the relative position $^2P^1$ of the receiving-side vehicle V1, and extracts an obstacle $j_{min}$ having the minimum distance $d_{1,j}$, from all of the obstacles detected. The distance d is a difference in position (or error) between the positions of two points, and the degree of agreement or coincidence is higher as the value d is smaller. The information transmission determining unit 24 determines whether the distance $d_{1,jmin}$, of the obstacle $j_{min}$ is equal to or smaller than a threshold value $d_{pos}$. The threshold value $d_{pos}$ is set in advance in view of a sensing error of the obstacle detection sensor, and it can be assumed that a sensing error occurs if the distance is larger than the threshold value. If the distance $d_{1,jmin}$ is larger than the threshold value $d_{pos}$, the information transmission determining unit 24 determines that the obstacle detection sensor 22 cannot detect the receiving-side vehicle V1, and generates an outside-of-detection flag to the communication device 21 as data to be transmitted, so as to inform the vehicle V1 that the vehicle V1 is outside the range of detection. If the distance $d_{1,jmin}$ is equal to or smaller than the threshold value $d_{pos}$, on the other hand, the information transmission determining unit 24 determines that the obstacle detection sensor 22 detects the receiving-side vehicle V1, and calculates the vehicle speed and yaw rate of the obstacle $j_{min}$, based on the information $O_{jmin}$ on the position of the obstacle $j_{min}$. For example, the vehicle speed $^Wv_{jmin,k}$ on the absolute coordinate system at the current time k can be calculated according to the expression (6) as indicated below, using the position $O_{jmin,k}$ at the current time k, the position $O_{jmin,k-m}$ at a point in time that precedes the current time by m, and the position $O_{jmin,k-n}$ at a point in time that precedes the current time by n (>m), and the vehicle speed $^Wv_{jmin,m}$ on the absolute coordinate system can be calculated according to the expression (7) as indicated below. Furthermore, the yaw rate $^W\omega_{jmin,k}$ on the absolute coordinate system at the current time k can be calculated according to the expression (8) as indicated below. The information transmission determining unit 24 generates the vehicle speed $^Wv_{jmin,k}$ and yaw rate $^W\omega_{jmin,k}$ to the communication device 21 as data to be transmitted, so as to send the vehicle rate and yaw rate to the receiving-side vehicle V1 (obstacle $j_{min}$).

$$^Wv_{jmin,k}=\frac{(O_{jmin,k}-O_{jmin,k-m})}{m} \quad (6)$$

-continued $$^Wv_{jmin,k}=\frac{(O_{jmin,k-m}-O_{jmin,k-n})}{n-m} \quad (7)$$

$$^W\omega_{jmin,k}=\frac{\cos^{-1}({}^Wv_{jmin,k}\times{}^Wv_{jmin,m}/|{}^Wv_{jmin,k}|\times|{}^Wv_{jmin,m}|)}{m} \quad (8)$$

where, m and n are sufficiently short periods of time that enable approximate calculation of the motion of the vehicle according to the above expressions (6) to (8).

Subsequently, the information transmission determining unit 24 obtains a designated region transmission request of the receiving-side vehicle V1 from the communication device 21 as received data (namely, receives the designated region transmission request from the receiving-side vehicle V1), and recognizes the designated region $^WR_1$ in the absolute coordinate system. Then, the information transmission determining unit 24 converts the designated region $^WR_1$ (closed region) expressed as a sequence of points in the absolute coordinate system as indicated below by the expression (9), into a designated region $^2R_1$ in the relative coordinate system of the vehicle V2 as indicated below by the expression (10), according to the above-indicated expression (5).

$$^WR_1=\{{}^Wp_1,\ldots,{}^Wp_s\} \quad (9)$$

$$^2R_1=\{{}^2p_1,\ldots,{}^2p_s\} \quad (10)$$

Subsequently, the information transmission determining unit 24 determines whether the designated region $^2R_1$ in the relative coordinate system is within the range of detection of the obstacle detection sensor 22. If the designated region $^2R_1$ is located outside the range of detection of the obstacle detection sensor 22, the information transmission determining unit 24 determines that the sensor 22 cannot detect any obstacle on which information is needed by the receiving-side vehicle V1, and generates an outside-of-detection flag to the communication device 21 as data to be transmitted, so as to inform the vehicle V1 that the designated region is outside the range of detection.

If the designated region $^2R_1$ is within the range of detection of the obstacle detection sensor 22, the information transmission determining unit 24 determines whether there is any obstacle whose position $^2O_j$ is in the designated region $^2R_1$, among the obstacles detected by the obstacle detection sensor 22. If it is determined that there is no obstacle whose position $^2O_j$ is in the designated region $^2R_1$, among all of the detected obstacles j, the information transmission determining unit 24 generates a zero obstacle flag to the communication device 21 as data to be transmitted, so as to inform the vehicle V1 that no obstacle can be sensed in the designated region $^WR_1$. If it is determined that the detected obstacles j include one or more obstacles whose position(s) $^2O_j$ is/are in the designated region $^2R_1$, the information transmission determining unit 24 converts each of the obstacle positions $^2O_j$ on the relative coordinate system into an obstacle position $^WO_j$ on the absolute coordinate system. Then, the information transmission determining unit 24 generates the obstacle position $^WO_j$ on the absolute coordinate system to the communication device 21 as data to be transmitted, so as to provide the information on the position of the obstacle to the receiving-side vehicle V1.

Figure 6:
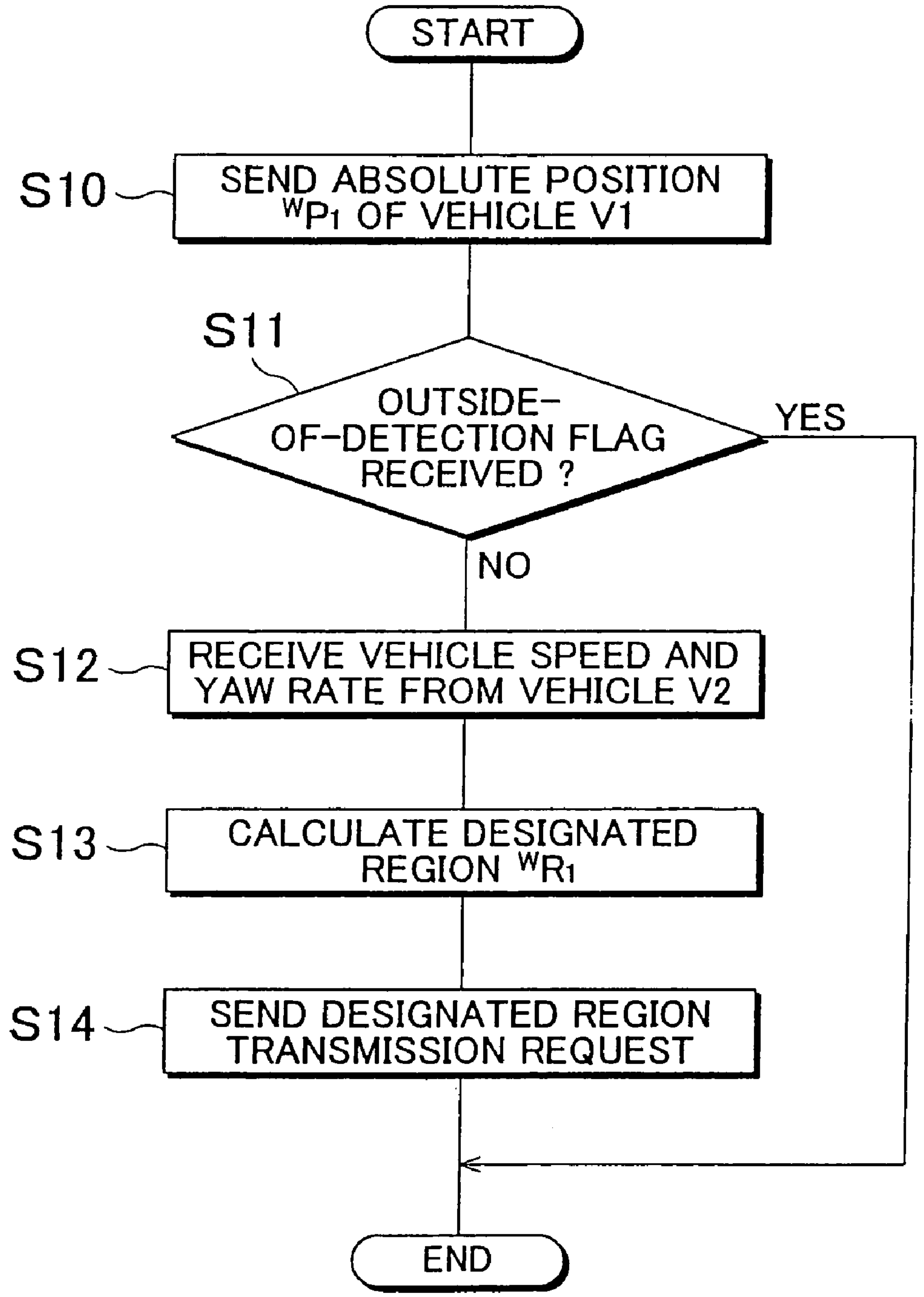
FIG. 6 is a flowchart illustrating the flow of a process mainly performed by a region determining unit of FIG. 2.
Figure 7A:
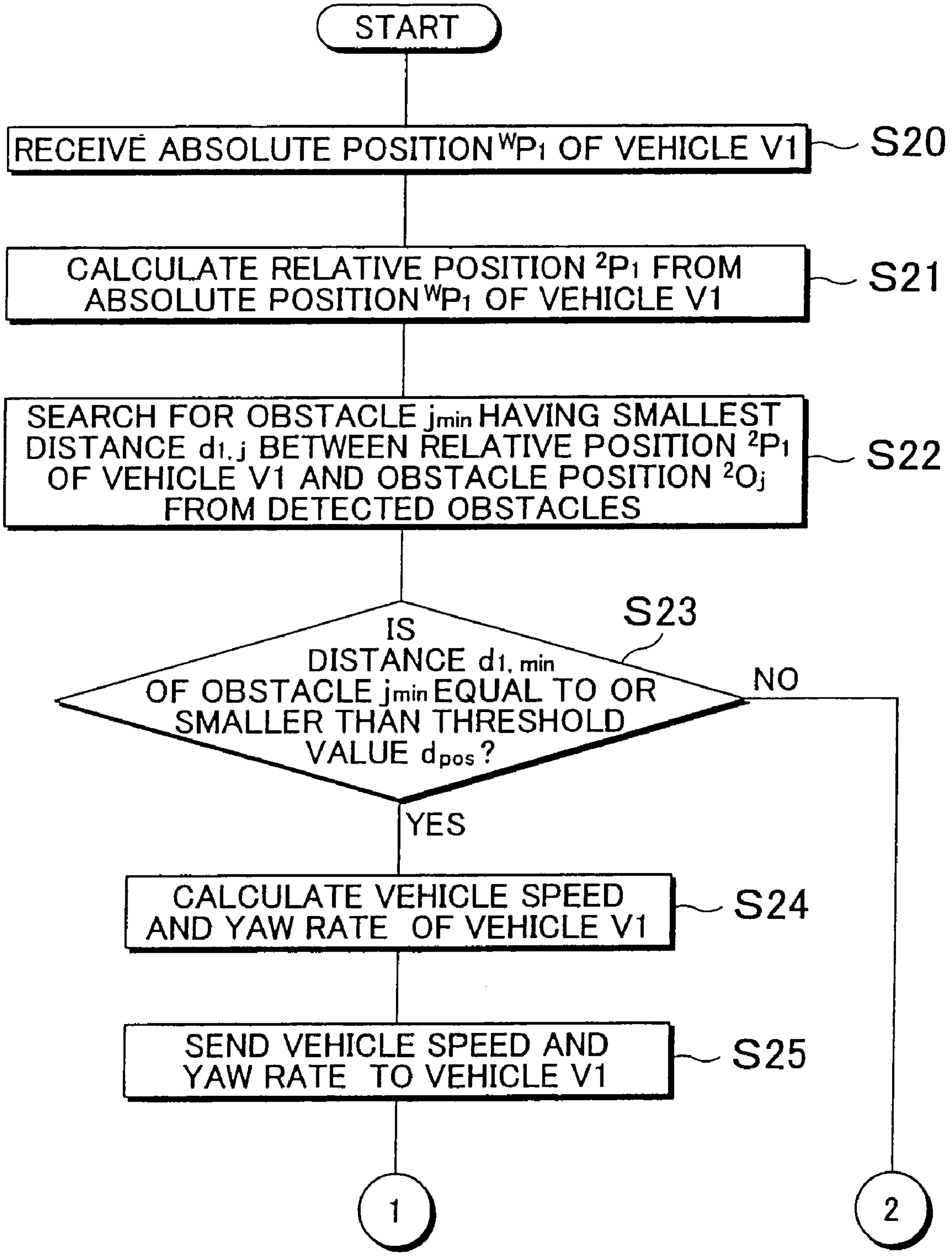
FIGS. 7A and 7B are a flowchart illustrating the flow of a process mainly performed by an information transmission determining unit of FIG. 2.
Figure 7B:
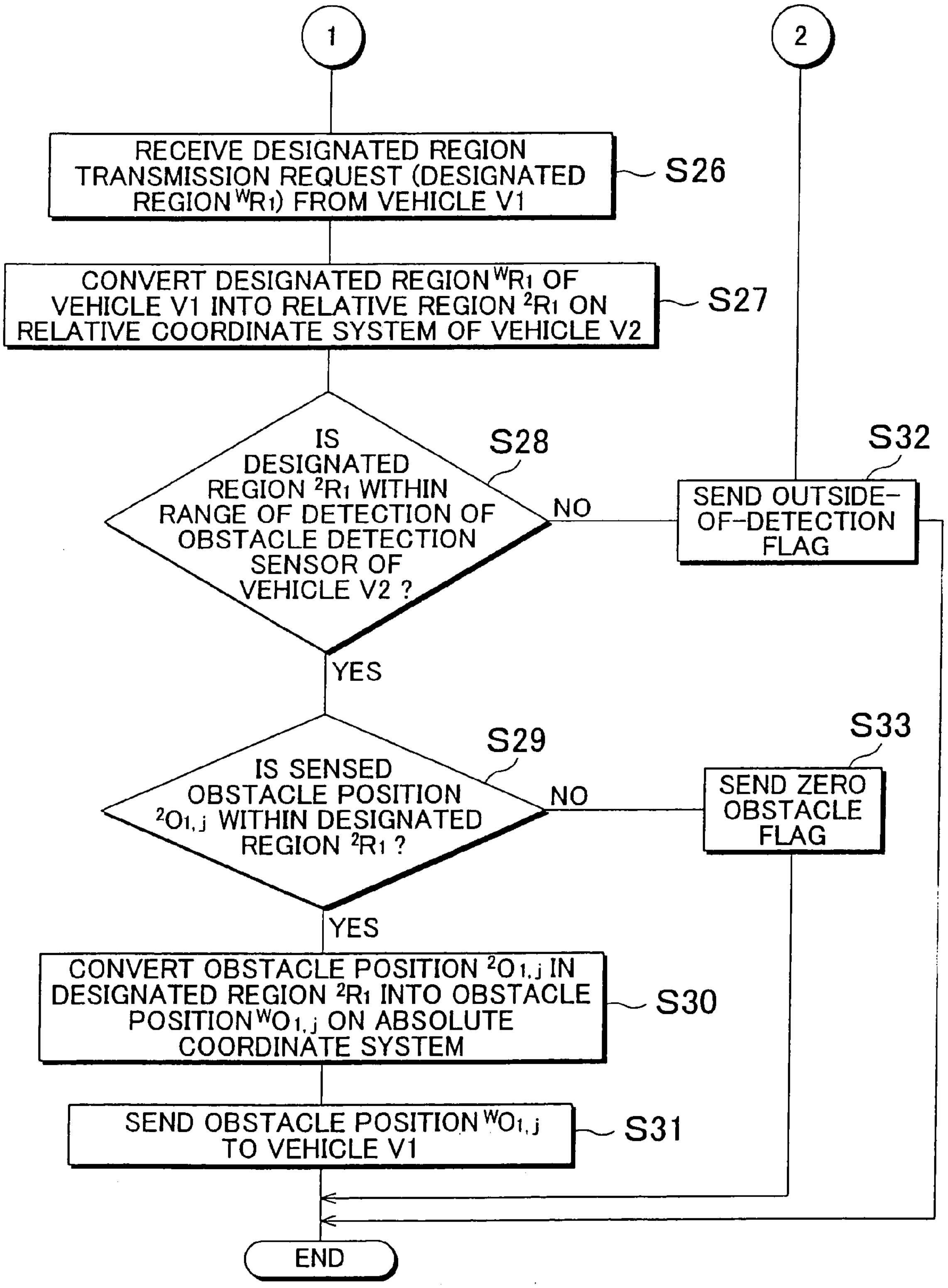

Referring to FIG. 1 through FIG. 7B, the operation of the road condition detecting system of the first embodiment will be explained. In particular, a process performed by the receiver 10A will be described with reference to the flowchart of FIG. 6, and a process performed by the transmitter 20A will be described with reference to the flowchart of FIGS. 7A and 7B. The flowchart of FIG. 6 illustrates the flow of the process mainly performed by the region determining unit 13 of the receiver 10A of FIG. 2. The flowchart of FIGS. 7A and 7B illustrates the flow of the process mainly performed by the information transmission determining unit 24 of the transmitter 20A of FIG. 2. In the system, there are at least one receiver 10A of one or more receiving-side vehicles V1 and at least one transmitter 20A of one or more sending-side vehicles V2, and these receiver(s) and transmitter(s) repeatedly perform the operations as described below.

In the receiver 10A of the receiving-side vehicle V1, the absolute position $^{W}P_1$ of the own vehicle V1 is specified, and the communication device 11 sends the absolute position $^{W}P_1$ to, for example, the sending-side vehicle V2 (S10). Then, the receiver 10A determines whether it receives an outside-of-detection flag from the sending-side vehicle V2 (S11). If it is determined tin step S11 that the receiver 10A receives the outside-of-detection flag, the receiver 10A finishes the current cycle of the routine of FIG. 6.

If, on the other hand, it is determined in step S11 that no outside-of-detection flag is received, the receiver 10A receives the vehicle speed $v_1$ and yaw rate $\omega_1$ of the vehicle V1 in the absolute coordinate system from the sending-side vehicle V2 (S12), and calculates a designated region $^{W}R_1$ for which the receiving-side vehicle V1 needs obstacle information, using the above items of information (S13). Then, the communication device 11 of the receiver 10A sends a designated region transmission request indicative of the designated region $^{W}R_1$, to the sending-side vehicle V2 (S14).

In the transmitter 20A of the sending-side vehicle V2, the obstacle detection sensor 22 operates to detect obstacles j in the vicinity of the vehicle V2, and calculates the relative position $^{2}O_j$ of each obstacle j if one or more obstacles j exist around the vehicle V2. Also, the transmitter 20A receives the absolute position $^{W}P_1$ of the receiving-side vehicle V1 at the communication device 21 (S20), and calculates the relative position $^{2}P_1$ of the vehicle V1 relative to the vehicle V2 from the absolute position $^{W}P_1$ (S21).

Then, the transmitter 20A calculates the distance $d_{1,j}$ between the relative position $^{2}P_1$ of the receiving-side vehicle V1 and the relative position $^{2}O_j$ of each obstacle j, with respect to all of the sensed obstacles j, and makes a search for an obstacle $j_{min}$ having the minimum distance $d_{1,jmin}$ from all of the sensed obstacles j (S22). Then, the transmitter 20A determines whether the minimum distance $d_{1,jmin}$ is equal to or smaller than the threshold value $d_{pos}$ (S23). If it is determined in step S23 that the distance $d_{1,jmin}$ is larger than the threshold value $d_{pos}$, the transmitter 20A causes the communication device 21 to send an outside-of-detection flag to the receiving-side vehicle V1 (S32).

If, on the other hand, it is determined in step S23 that the distance $d_{1,jmin}$ is equal to or smaller than the threshold value $d_{pos}$, the transmitter 20A calculates the vehicle speed and yaw rate of the obstacle $j_{min}$, using the time-series obstacle positions $O_{jmin,k}$, $O_{jmin,k\text{-}m}$, $O_{jmin,k\text{-}n}$ of the obstacle $j_{min}$ (S24), and causes the communication device 21 to send the vehicle speed and yaw rate to the receiving-side vehicle V1 (S25).

Then, the communication device 21 of the transmitter 20A receives a designated region transmission request (designated region $^{W}R_1$) from the receiving-side vehicle V1 (obstacle $j_{min}$) (S26), and the transmitter 20A converts the designated region $^{W}R_1$ in the absolute coordinate system into a designated region $^{2}R_1$ in the relative coordinate system of the own vehicle V2 (S27).

Subsequently, the transmitter 20A determines whether the designated region $^{2}R_1$ in the relative coordinate system is within the range of detection of the obstacle detection sensor 22 (S28). If it is determined in step S28 that the designated region $^{2}R_1$ is outside the range of detection, the communication device 21 of transmitter 20A sends an outside-of-detection flag to the receiving-side vehicle V1 (S32). If, on the other hand, the designated region $^{2}R_1$ is within the range of detection, the transmitter 20A determines whether there is any obstacle, among the obstacles j sensed by the vehicle V2, whose position $^{2}O_{1,j}$ is in the designated region $^{2}R_1$ (S29). If it is determined in step S29 that there is no obstacle in the designated region $^{2}R_1$, the communicating device 21 of the transmitter 20A sends a zero obstacle flag to the receiving-side vehicle V1 (S33).

If, on the other hand, it is determined in step S29 that one or more obstacles exist in the designated region $^{2}R_1$, the transmitter 20A converts the obstacle position $^{2}O_{1,j}$ of each obstacle j located in the designated region $^{2}R_1$ on the relative coordinate system, into the obstacle position $^{W}O_{1,j}$ on the absolute coordinate system (S30), and causes the communication device 21 to send the obstacle position $^{W}O_{1,j}$ to the receiving-side vehicle V1 (S31).

If there are two or more vehicles V1, the sending-side transmitter 20A performs the above-described process with respect to all of the vehicles V1 from which the absolute positions and designated region transmission requests are transmitted.

When the communication device 11 of the receiver 10A of the receiving-side vehicle V1 receives the obstacle position $^{W}O_{1,j}$, the receiver 10A converts the obstacle position $^{W}O_{1,j}$ into an obstacle position $^{1}O_{1,j}$ on the relative coordinate system of the own vehicle V1. Then, the receiver 10A determines whether production of alarm and display outputs and intervention control are necessary, based on the relationship between the obstacle position $^{1}O_{1,j}$ and the traveling direction or vehicle speed of the own vehicle V1. If deemed necessary, production of alarm and display outputs and intervention control are performed. If, on the other hand, the communication device 11 of receiver 10A receives an outside-of-detection flag or a zero obstacle flag, the receiver 10A informs the driver that it is impossible or unnecessary to produce an alarm output or display output and perform intervention control. Where the vehicle V1 is equipped with an obstacle detection sensor, production of alarm output and display output and intervention control are performed in view of the information on obstacles sensed by the obstacle detection sensor, as well as the obstacle information received from the transmitter 20A. In this case, driving assist can be performed even when the receiver 10A receives an outside-of-detection flag or a zero obstacle flag. In the case where two or more sending-side vehicles are present, alarm and display outputs cannot be produced and intervention control cannot be performed only when outside-of-detection flags or zero obstacle flags are received from all of the sending-side vehicles.

In the road condition detecting system of the first embodiment, the receiving-side vehicle V1 designates a region for which obstacle information is needed, and sends the designated region to sending-side vehicle V2, so that the sending-side vehicle V2 can efficiently select obstacle information needed at the receiving end, and send the obstacle information needed at the receiving end with high reliability. Consequently, the receiving-side vehicle V1 is able to obtain only the necessary obstacle information, and at the same time the amount of traffic in vehicle-to-vehicle communications can be reduced, thus preventing the communication zone from being expanded.

Figure 8:
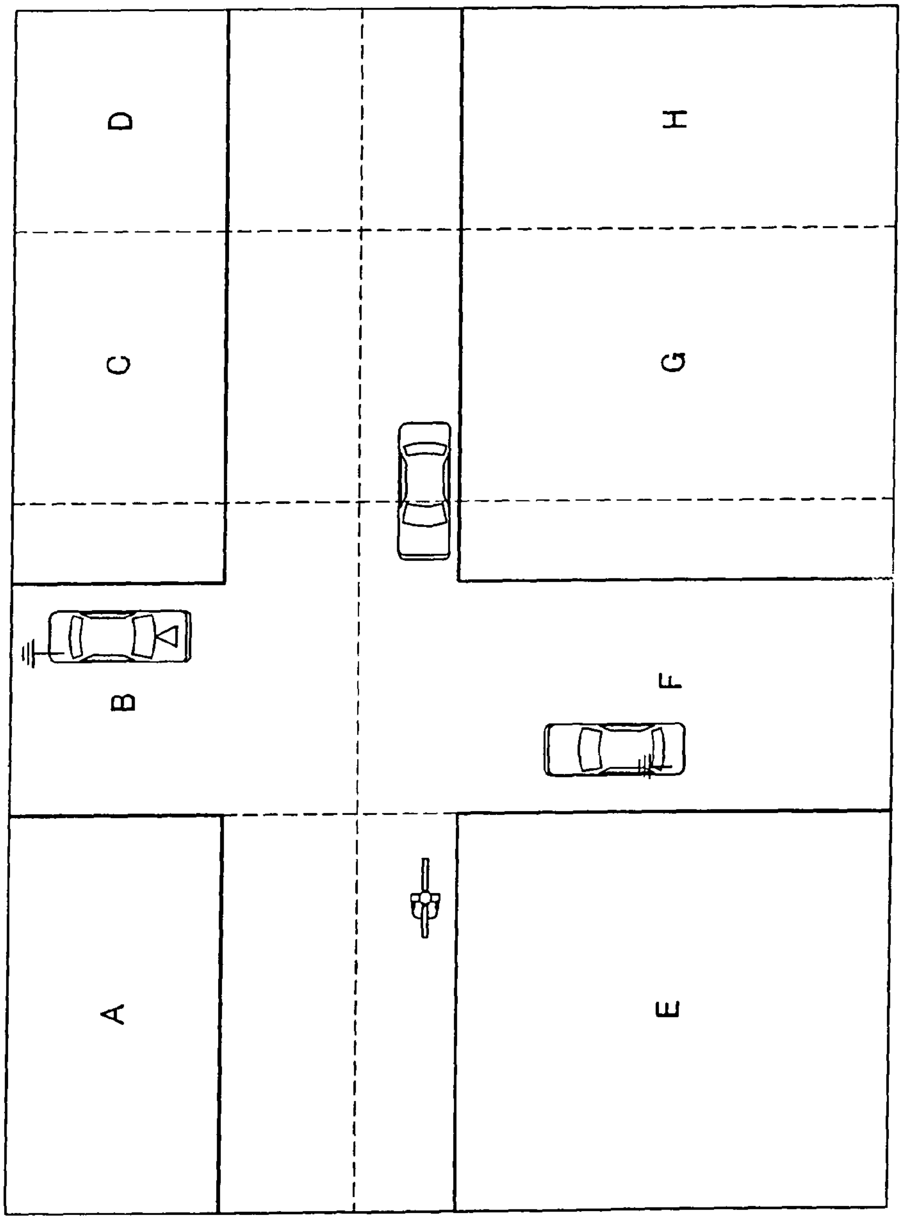
FIG. 8 is a view showing another method of expressing the designated region according to the embodiment of FIG. 2.
Figure 9:
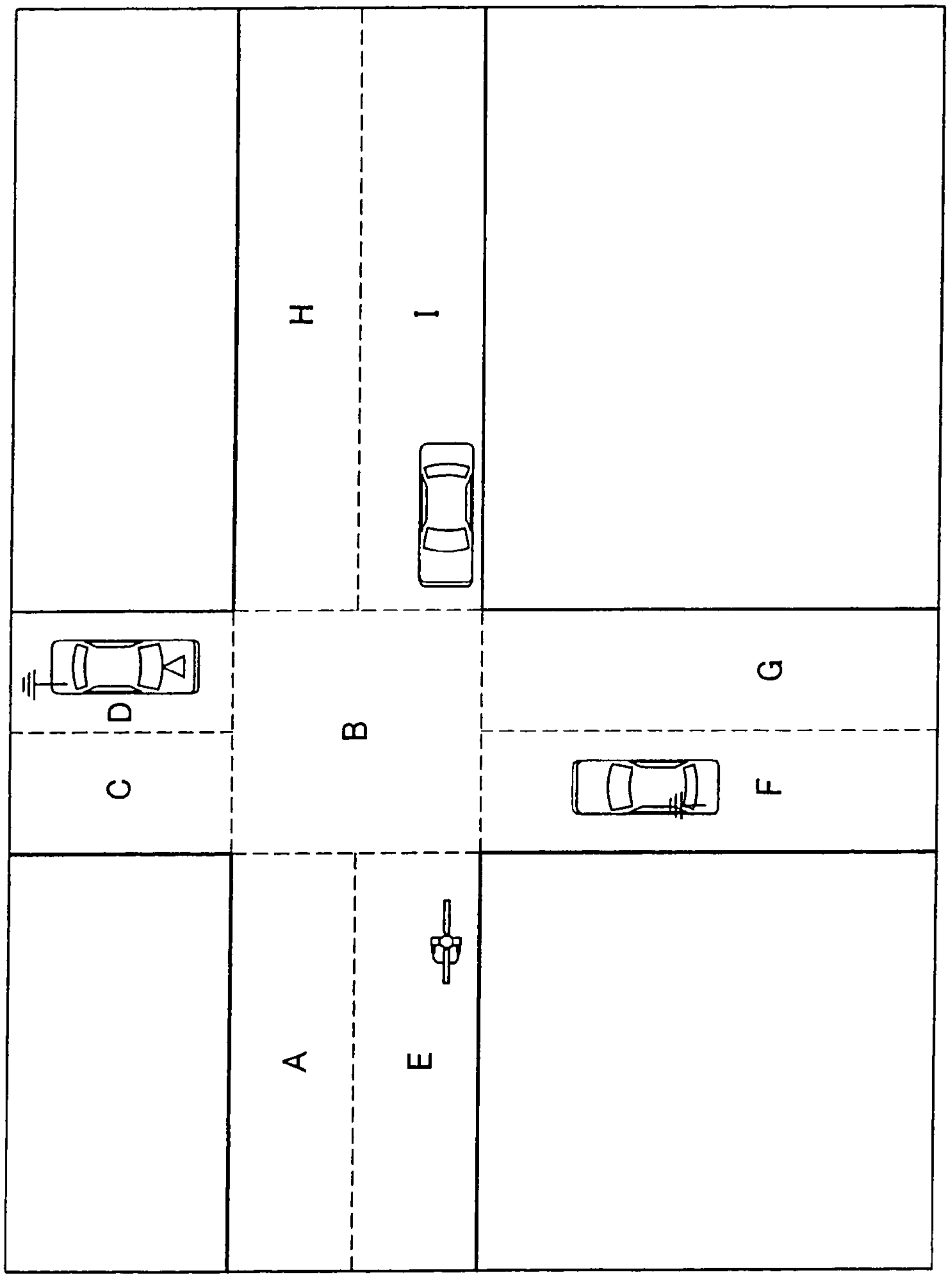
FIG. 9 is a view showing a further method of expressing the designated region according to the embodiment of FIG. 2.
Figure 10:
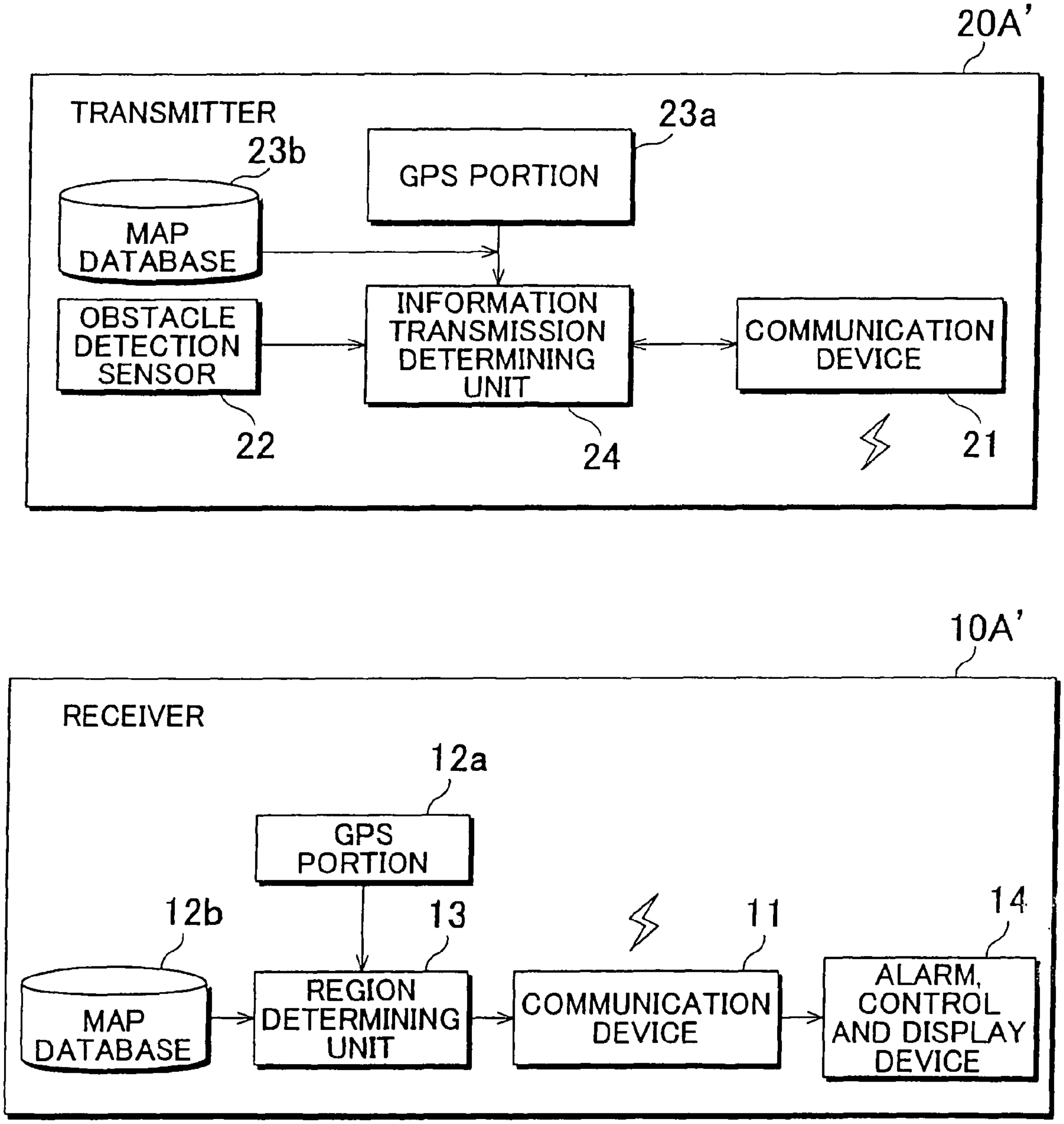
FIG. 10 is a view showing the construction of receiver and transmitter of a modified example of the road condition detecting system of the first embodiment.

While the closed region is used as the designated region $^{W}R_1$ in the illustrated embodiment, the absolute coordinate system may be formulated into a meshed pattern consisting of mesh regions, and identifying symbols A, B, . . . may be assigned to the respective mesh regions, as shown in FIG. 8, so that the designated region transmission request, and other information, can be controlled or managed with the identifying symbols A, B, . . . . Also, as shown in FIG. 10, the own-vehicle-position specifying unit of the receiver 10A' for producing information that specifies the position of the own vehicle may include a GPS portion 12*a* and a map database 12*b*, and, similarly, the other-vehicle-position specifying unit of the transmitter 20A' may include a GPS portion 23*a* and a map database 23*b*. With this arrangement, the position of the vehicle can be specified through the use of the GPS, and regions located outside roads, which may contain buildings, can be excluded in advance from the designated region, based on map data. In this manner, it is possible to send and receive a designated region transmission request (designated region) that consists solely of roads, as shown in FIG. 9, and thus further reduce the amount of traffic in vehicle-to-vehicle communications. As also shown in FIG. 9, the roads may be divided into meaningful sections in terms of running, with reference to the positions of intersections and lanes, based on map data, and identifying symbols A, B, . . . may be assigned to the respective sections, so that the designated region transmission request, and other information, can be controlled or managed with the identifying symbols A, B, . . . . In this case, the information can be transmitted and received with improved efficiency.

Figure 11:
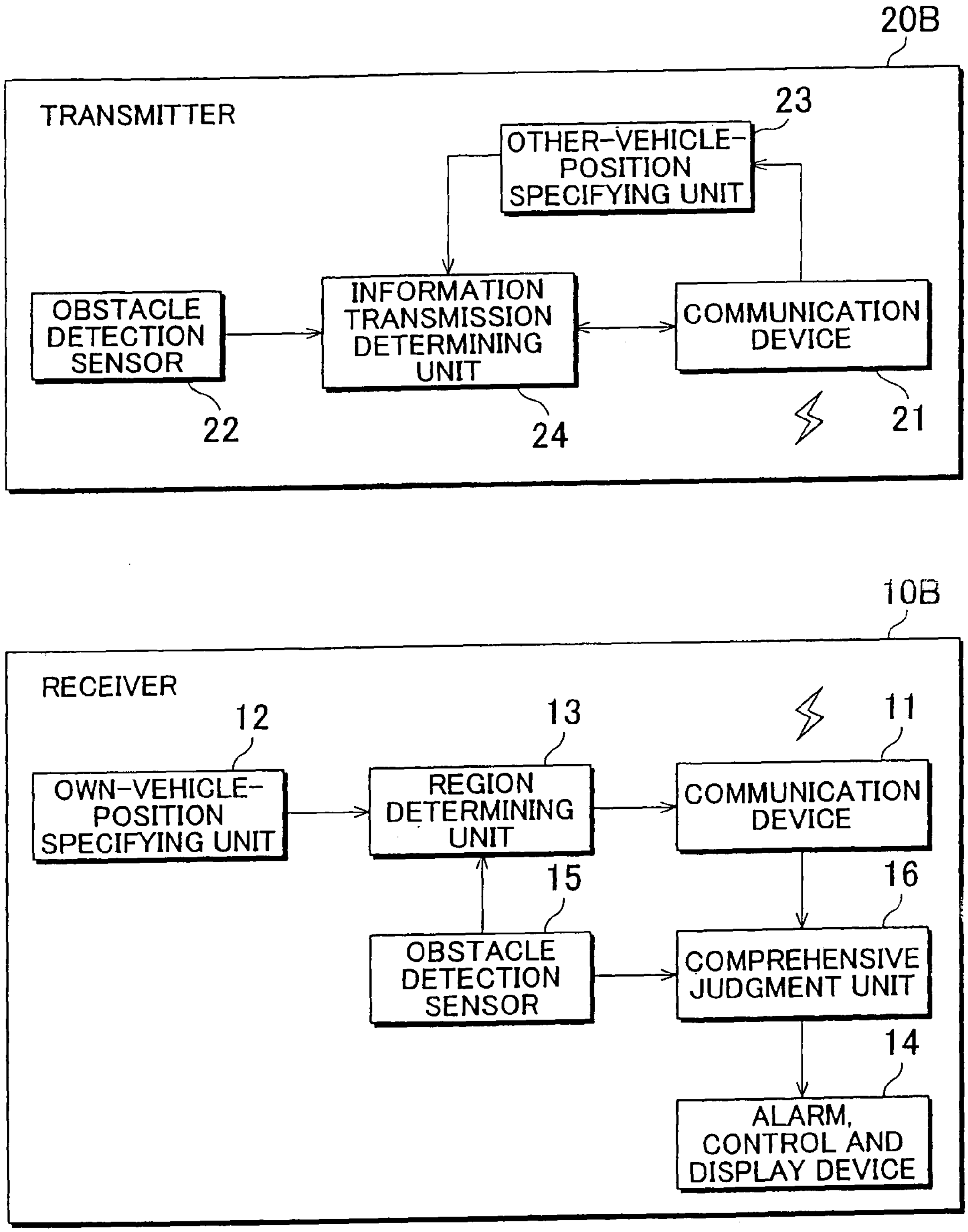
FIG. 11 is a view showing the construction of receiver and transmitter of a road condition detecting system according to a second embodiment of the invention.

Referring to FIG. 1 and FIG. 11, a road condition detecting system according to a second embodiment of the invention will be described. FIG. 11 shows the construction of receiver and transmitter included in the road condition detecting system of the second embodiment. In the road condition detecting system of the second embodiment, the same reference numerals as used in the road condition detecting system of the first embodiment will be used for identifying structurally and/or functionally corresponding elements, of which no detailed description will be provided.

The road condition detecting system of the second embodiment consists of one or more receivers 10B installed on at least one vehicle V1 and one or more transmitters 20B installed on at least one vehicle V2, and vehicle-to-vehicle communications are conducted between the receiver(s) 10B and the transmitter(s) 20B. In particular, the road condition detecting system of the second embodiment is different from that of the first embodiment in that the receiver 10B performs a process of determining the correctness of obstacle information obtained from the transmitter 20B, so as to operate the system more robustly. The transmitter 20B is similar in construction to the transmitter 20A of the first embodiment, and therefore will not be described herein.

The receiver 10B will be described in more detail. As compared with the receiver 10A of the first embodiment, the receiver 10B includes an obstacle detection sensor as a means for detecting obstacles, and compares information about obstacles detected by itself with obstacle information obtained from the other vehicle V2. If the obstacle information obtained by itself is greatly different from the obstacle information received from the other vehicle V2 with respect to the same region, the receiver 10B determines that the obstacle information of the obstacle detection sensor of the vehicle V2 is wrong, and abandons the obstacle information from the vehicle V2. To perform this function, the receiver 10B includes a communication device 11, an own-vehicle-position specifying unit 12 for producing information that specifies the position of the own vehicle, a region determining unit 13, an alarm, control and display device 14, an obstacle detection sensor 15 and a comprehensive judgment unit 16. In the second embodiment, the communication device 11 may be regarded as the above-mentioned receiving means of the receiver, and the region determining unit 13 and communication device 11 may be regarded as the above-mentioned region request transmitting means, while the obstacle detection sensor 15 may be regarded as the above-mentioned receiving-side vicinity information obtaining means, and the comprehensive judgment unit 16 may be regarded as the above-mentioned received information judging means.

The communication device 11, own-vehicle-position specifying unit 12, region determining unit 13 and the alarm, control and display device 14 are similar in construction to those of the first embodiment, and therefore will not be described in detail. The obstacle detection sensor is similar in construction to the obstacle detection sensor 22 of the transmitter 20A of the first embodiment, and therefore will not be described in detail.

The region determining unit 13 for determining a region for which obstacle information is to be obtained sets a designated region, such that regions, such as those outside the range of detection of the obstacle detection sensor 15, and blocked or hidden regions (blocked or hidden by buildings, other vehicle, boards, walls or the own vehicle V1), are considered as out-of-sight regions. Also, the region determining unit 13 creates a designated region ${}^{1}R_n$ associated with a region in which an obstacle is detected by the obstacle detection sensor 15. As an example of creating the region, a region inside positional errors $P_{err}$ that are allowed for with respect to the position $P_{1,n}=(P_{x1,n}, P_{y1,n})$ of the detected obstacle, namely, a region defined by a circle as represented by the expression (11) below, may be determined as the designated region ${}^{1}R_n$. The designated region ${}^{1}R_n$ in which the obstacle exists may have any appropriate size and shape, and one or more (N0) designated region(s) ${}^{1}R_n$ are created.

$$(x-P_{x1})^2+(y-P_{y1})^2=P_{err} \tag{11}$$

The comprehensive judgment unit 16 compares the obstacle information obtained from the obstacle detection sensor 15 with the obstacle information received from the sending-side vehicle V2. If the obstacle information obtained from the obstacle detection sensor 15 does not agree with the obstacle information from the sending-side vehicle V2 (if there is a large difference between these pieces of information), the comprehensive judgment unit 16 determines that there is an abnormality in the vehicle V2, and does not use the obstacle information from the vehicle, V2. If there are two or more vehicles V2 that transmit obstacle information, the correctness of the obstacle information is determined with respect to each of the vehicles V2.

More specifically, when the comprehensive judgment unit 16 obtains obstacle information as received data from the communication device 11, the unit 16 extracts obstacle information (the number of obstacles $N_{obj,\ n}$ and the position ${}^{W}O_{2,m}$, of each obstacle) as a result of sensing at the vehicle V2 in the designated region ${}^{1}R_n$, from the obtained obstacle information, with respect to each designated region ${}^{1}R_n$ in which an obstacle exists. If the communication device 11 receives an outside-of-detection flag for the designated region ${}^{1}R_n$, the comprehensive judgment unit 16 does not perform any process on the designated region ${}^{1}R_n$, but increments an outside-of-detection count $C_{out}$ and proceeds to a process on the next designated region ${}^{1}R_n$. The outside-of-detection count $C_{out}$ is used for calculating the number of regions subjected to error evaluations from the number of designated regions ${}^{1}R_n$ and calculating the sensing error rate $Rate_{Cerr}$ at the other vehicle V2.

For each of the designated regions ${}^{1}R_n$ in which the vehicle V2 can sense an obstacle or obstacles, the comprehensive judgment unit 16 converts the obstacle position ${}^{1}P_{1,n}$ of the obstacle detected by the obstacle detection sensor 15, which is defined in the relative coordinate system, into an obstacle position ${}^{W}P_{1,n}$ in the absolute coordinate system. Then, the comprehensive judgment unit 16 calculates a distance between the obstacle position ${}^{W}O_{2,m}$ sensed by the vehicle V2 and the obstacle position ${}^{W}P_{1,n}$ sensed by the own vehicle V1, and determines whether the distance is within the positional errors $P_{err}$. Namely, it is determined whether the same obstacle is sensed by the vehicle V2 and the own vehicle V1. The positional errors $P_{err}$ are set in advance in view of sensing errors of the obstacle detection sensors, and it can be presumed that a sensing error occurs if the distance between the two points is larger than the positional errors $P_{err}$. The comprehensive judgment unit 16 sequentially makes this determination by comparison on $N_{obj}$, n-piece obstacles sensed by the vehicle V2 in the designated region ${}^{1}R_{n}$. If the unit 16 finds an obstacle with respect to which the distance between the two points is within the positional errors $P_{err}$ (i.e., if there is any obstacle sensed by both the own vehicle V1 and the other vehicle V2), the comprehensive judgment unit 16 proceeds to a process on the next designated region ${}^{1}R_{n+1}$. If there is no obstacle with respect to which the distance between the two points is within the positional errors $P_{err}$ (i.e., if there is no obstacle sensed by both the own vehicle V1 and the other vehicle V2), the comprehensive judgment unit 16 determines that an error occurs to the region in question, increments an error count $C_{err}$, proceeds to a process on the next designated region ${}^{W}R_{n+1}$.

If the process on the N0-piece designated regions ${}^{1}R_{n}$ is finished, the comprehensive judgment unit 16 calculates the sensing error rate $Rate_{Cerr}$ according to the expression (12) as indicated below, using the outside-of-detection $C_{out}$ and the error count $C_{err}$. Then, the comprehensive judgment unit 16 determines whether the sensing error rate $Rate_{Cerr}$ is equal to or smaller than a threshold value $TH_{err}$. The threshold value $TH_{err}$ is set in advance by experiment, for example.

$$Rate_{Cerr} = \frac{C_{err}}{(N0 - C_{out})} \tag{12}$$

If the sensing error rate $Rate_{Cerr}$ is equal to or smaller than the threshold value $TH_{err}$, the comprehensive judgment unit 16 determines that no sensing error occurs in the vehicle V2, and uses obstacle information obtained from the vehicle V2. If the sensing error rate $Rate_{Cerr}$ is larger than the threshold value $TH_{err}$, on the other hand, the comprehensive judgment unit 16 determines that a sensing error occurs in the vehicle V2, sets an error flag for the vehicle V2, and does not use obstacle information obtained from the vehicle V2. In this case, the comprehensive judgment unit 16 generates the error flag to the communication device 11 as data to be transmitted, so as to send the error flag to the vehicle V2.

The alarm, control display device 14 produces alarm output and display output and performs intervention control, using obstacle information from the vehicle V2 in which no sensing error occurs (the vehicle V2 for which no error flag is set), and obstacle information detected by the own vehicle V1. The receiver 10B uses the obstacle information obtained by the own vehicle V1, to which a higher priority is given, but may average and integrate the obstacle information obtained by the own vehicle V1 and corresponding obstacle information received from the vehicle V2, if any.

The receiver 10B provides obstacle information detected by the own vehicle V1 to other vehicles. Thus, if error flags are transmitted from all of the vehicles that carry out vehicle-to-vehicle communications, the receiver 10B determines that a sensing error occurs in the obstacle detection sensor 15 of the own vehicle V1, and stops the process at the comprehensive judgment unit 16 while inhibiting the alarm, control and display device 14 from using the obstacle information detected by the own vehicle V1.

Figure 12:
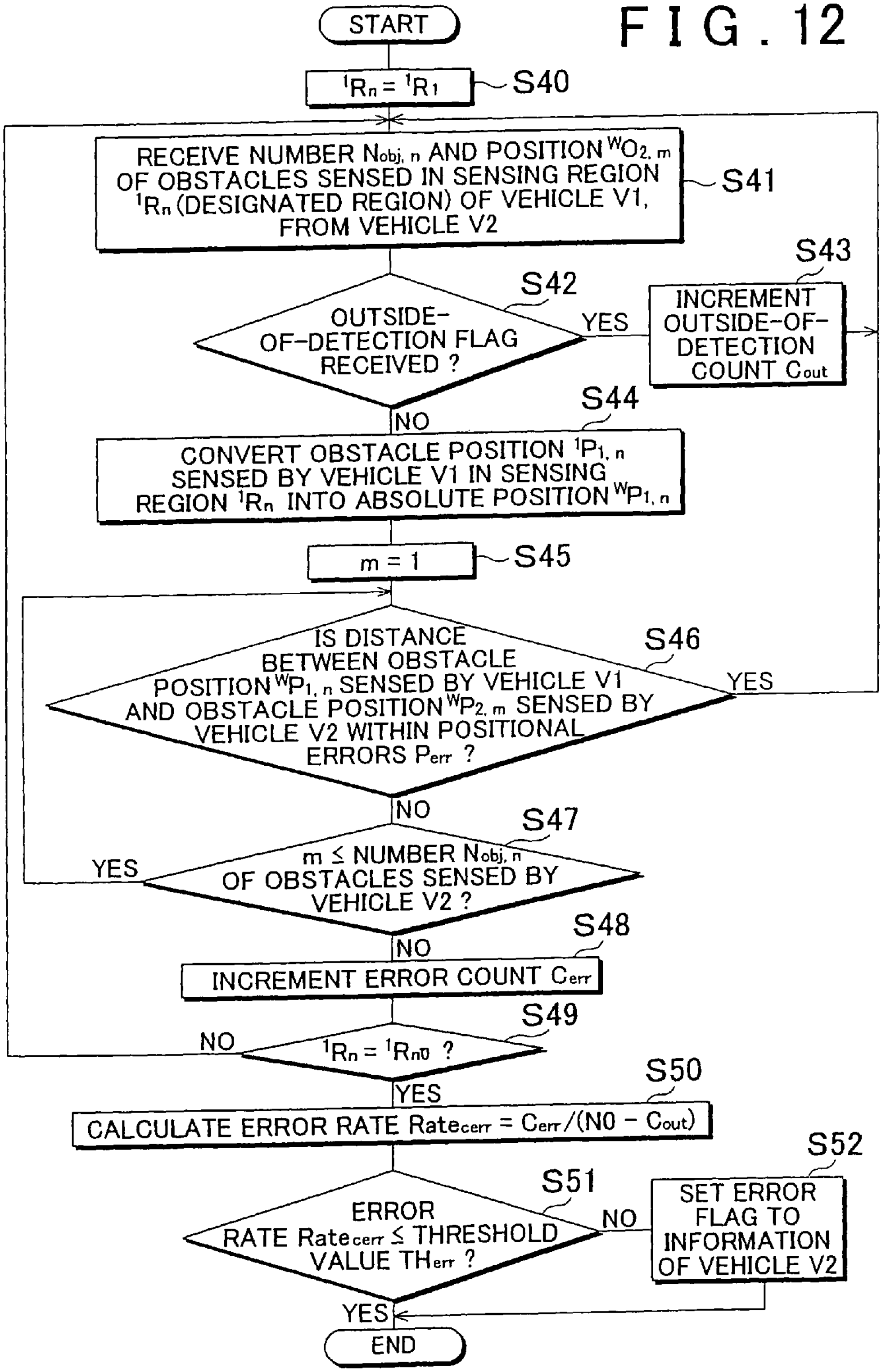
FIG. 12 is a flowchart illustrating the flow of a process performed by a comprehensive judgment unit of FIG. 11.

Referring to FIG. 1, FIG. 11 and FIG. 12, the operation of the road condition detection system of the second embodiment will be explained. In the road condition detecting system of the second embodiment, the receiver 10B performs an additional process, as compared with the road condition detecting system of the first embodiment. Thus, the additional process will be described in detail. In particular, a process performed by the comprehensive judgment unit 16 of the receiver 10B will be explained with reference to the flowchart of FIG. 12. The flowchart of FIG. 12 illustrates the flow of the process of the comprehensive judgment unit 16 of FIG. 11. The system includes at least one receiver 10B of the receiving-side vehicle(s) and at least one transmitter 20B of the sending-side vehicle(s) V2, and the operation as described below is repeatedly performed.

In the receiver 10B of the receiving-side vehicle V1, the obstacle detection sensor 15 detects obstacles that exist in the vicinity of the vehicle V1. If there is any obstacle in the vicinity of the vehicle V1, the receiver 10B calculates the relative position ${}^{1}P_{1,n}$ of the obstacle relative to the vehicle V1. To set designated regions, the receiver 10B calculates a designated region for which obstacle information is to be obtained in the same manner as in the first embodiment, and further sets respective regions in which obstacles are sensed by the own vehicle V1, as N0-pieces of designated regions ${}^{1}R_{n}$. Then, the communication device 11 of the receiver 10B sends a designated region transmission request indicative of each of the thus set designated regions to the sending-side vehicle V2.

When the communication device 11 of the receiver 10B of the receiving-side vehicle V1 receives information on an obstacle or obstacles sensed by the vehicle V2, the receiver 10B sets ${}^{1}R_{1}$ as an initial value to the designated region ${}^{1}R_{n}$ in which the obstacle(s) can be sensed (S40). Then, the receiver 10B extracts the number $N_{obj,n}$ and position(s) ${}^{W}O_{2,m}$ of the obstacle(s) sensed in the designated region ${}^{1}R_{n}$, from the received obstacle information, with respect to each of the designated regions ${}^{1}R_{n}$ in which the obstacles exist (S41). Also, the receiver 10B determines whether it receives an outside-of-detection flag for the designated region ${}^{1}R_{n}$ (S42). If it is determined in step S42 that an outside-of-detection flag is received, the receiver 10B does not perform any process on the designated region ${}^{1}R_{n}$, increments the out-of-detection count $C_{out}$, and proceeds to a process on the next designated region ${}^{1}R_{n+1}$.

If, on the other hand, it is determined in step S42 that no outside-of-detection flag is received, the receiver 10B converts the obstacle position ${}^{1}P_{1,n}$ on the relative coordinate system, of the obstacle sensed by the own vehicle V1 in the designated region ${}^{1}R_{n}$, into the obstacle position ${}^{W}P_{1,n}$ on the absolute coordinate system (S44). Then, the receiver 10B sets 1 to m (S45). Then, the receiver 10B determines whether the distance between the obstacle position ${}^{W}O_{2,m}$ of the obstacle sensed by the other vehicle V2 and the obstacle position ${}^{W}P_{1,n}$ of the obstacle sensed by the own vehicle V1 is within the positional errors $P_{err}$(S46).

If it is determined in step S46 that the distance between the two points is within the positional errors $P_{err}$, the receiver 10B determines that the obstacle sensed by the own vehicle V1 is identical with the obstacle sensed by the vehicle V2, and proceeds to the process on the next designated region $^{1}R_{n+1}$. If, on the other hand, it is determined in step S46 that the distance between the two points is not within the positional errors $P_{err}$, the receiver 10B determines whether m is equal to or smaller than the number $N_{obj,n}$ of obstacles sensed by the vehicle V2 (S47). If an affirmative decision (YES) is obtained in step S47, the receiver 10B adds 1 to m, and proceeds to the process on the next obstacle position $^{W}O_{2,\ m+1}$.

If, on the other hand, it is determined in step S47 that m is larger than the number of obstacles $N_{obj,\ n}$, the receiver 10B determines that the obstacles sensed by the vehicle V2 do not include any obstacle that is identical with the obstacle sensed by the own vehicle V1. In this case, the receiver 10 B determines that a sensing error occurs with respect to the designated region $^{1}R_{n}$, and increments the error count $C_{err}$ (S48). Then, the receiver 10B determines whether the designated region $^{1}R_{n}$ is the last designated region $^{1}R_{N0}$ of the N0-pieces of regions (S49). If it is determined in step S49 that the designated region $^{1}R_{n}$ is not the designated region $^{1}R_{N0}$, the receiver 10B proceeds to the process on the next designated region $^{1}R_{n+1}$.

If, on the other hand, it is determined in step S49 that the designated region $^{1}R_{n}$ is the last designated region $^{1}R_{N0}$, the process on all of the designated regions is finished, and therefore the receiver 10B calculates the sensing error rate $Rate_{Cerr}$ according to the above-indicated expression (12), using the out-of-detection count $C_{out}$, the error count $C_{err}$ and the number N0 of the designated regions $^{1}R_{n}$ (S50). Then, the receiver 10B determines whether the sensing error rate $Rate_{Cerr}$ is equal to or smaller than the threshold value $TH_{err}$ (S51).

If it is determined in step S51 that the sensing error rate $Rate_{Cerr}$ is equal to or smaller than the threshold value $TH_{err}$, the receiver 10B determines that no sensing error occurs in the vehicle V2. If, on the other hand, it is determined in step S51 that the sensing error rate $Rate_{Cerr}$ is larger than the threshold value $TH_{err}$, the receiver 10B determines that a sensing error occurs in the vehicle V2, and sets an error flag for the vehicle V2.

The receiver 10B performs the process of step S40 through step S52 with respect to all of the vehicles V2 from which obstacle information is transmitted to the vehicle V1.

Then, the receiver 10B produces alarm output and display output and performs intervention control in a manner similar to that of the first embodiment, based on the obstacle information from the vehicle(s) V2 for which no error flag is set, and the obstacle information on the obstacles detected by the own vehicle V1.

The road condition detecting system of the second embodiment provides the following effects, as well as those similar to the effects of the road condition detecting system of the first embodiment. In the road condition detecting system of the second embodiment, the receiving-side vehicle V1 evaluates the correctness of the obstacle information on obstacles sensed by the sending-side vehicle V2, based on the obstacle information on obstacles sensed by the own vehicle V1, and abandons or discards the obstacle information from the vehicle V2 if a sensing error occurs in the vehicle V2. Thus, the system can prevent the receiving-side vehicle from using erroneous obstacle information from the sending-side vehicle, and is thus able to operate more robustly.

Figure 13:
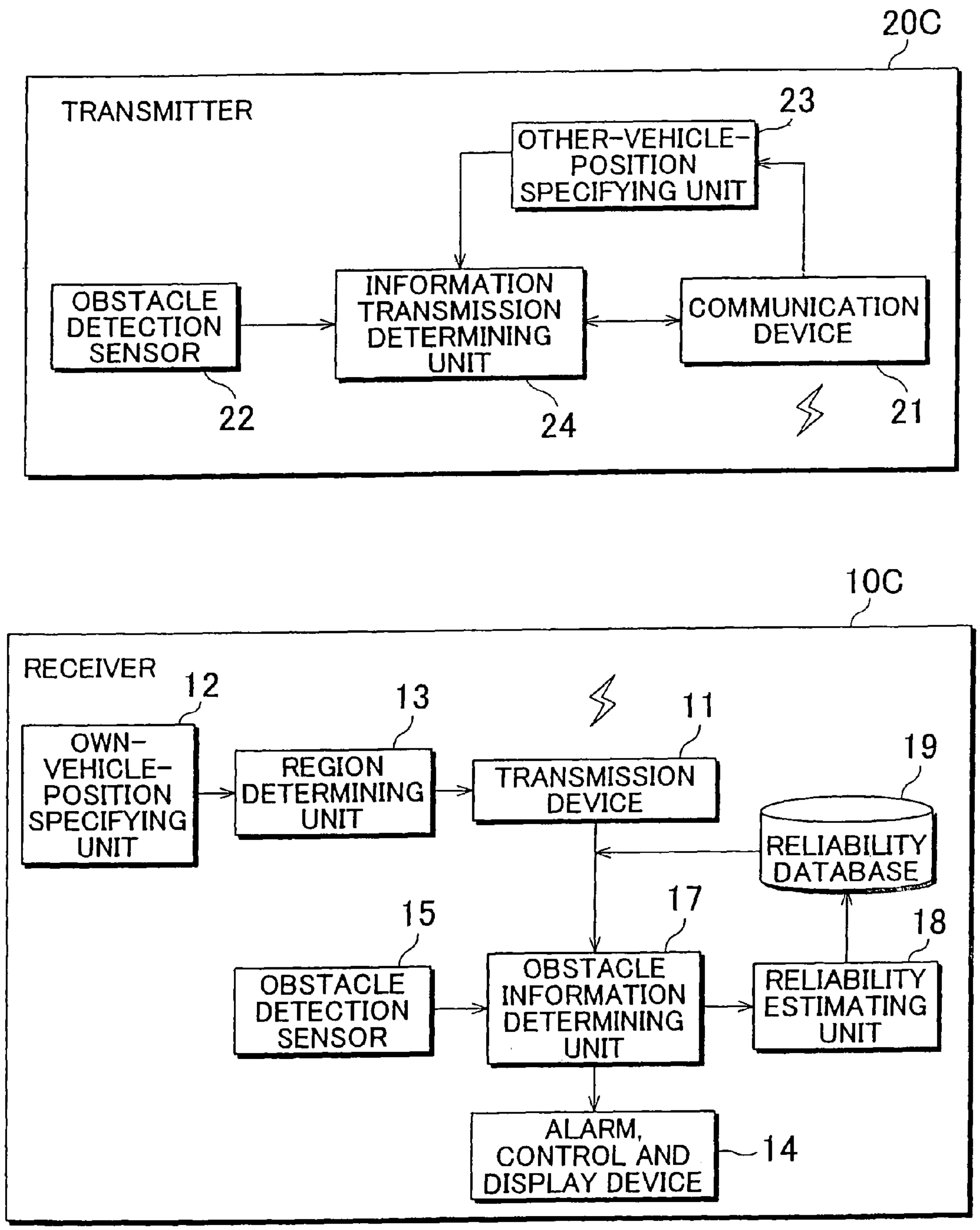
FIG. 13 is a view showing the construction of receiver and transmitter of a road condition detecting system according to a third embodiment of the invention.

Referring next to FIG. 1 and FIG. 13, a road condition detecting system according to a third embodiment of the invention will be described. FIG. 13 shows the construction of receiver and transmitter of the road condition detecting system of the third embodiment. In the road condition detecting system of the third embodiment, the same reference numerals as used in the road condition detecting system of the first embodiment are used for identifying structurally and/or functionally corresponding elements or components, of which no detailed description will be provided.

The road condition detecting system of the third embodiment consists of one or more receivers 10C installed on at least one vehicle V1 and one or more transmitters 20C installed on at least one vehicle V2, and the receivers 10C and transmitters 20C are arranged to conduct vehicle-to-vehicle communications so as to obtain obstacle information. In particular, the road condition detecting system of the third embodiment is different from that of the first embodiment in that the receiver 10C performs a different process, namely, a process of estimating the reliability of obstacle information received from the transmitter 20B, so as to evaluate the sensing reliability of the vehicle V2. The transmitter 20C is similar in construction to the transmitter 20A of the first embodiment, and therefore will not be further explained herein.

The receiver 10C will be described in more detail. As compared with the receiver 10A of the first embodiment, the receiver 10C further includes an obstacle detection sensor as a means for detecting obstacles, and compares obstacle information on obstacles detected by itself with obstacle information obtained from the other vehicle V2 so as to estimate the sensing reliability of each vehicle V2. In particular, the receiver 10C is able to estimate the reliability even in the case where the own vehicle V1 and the other vehicle V2 do not have the same sensing region at the same time. Also, the receiver 10C is able to successively update the reliability information, and keep the reliability information in the latest condition. To this end, the receiver 10C includes a communication device 11, an own-vehicle-position specifying unit 12, a region determining unit 13, an alarm, control and display device 14, an obstacle detection sensor 15, an obstacle information determining unit 17, a reliability estimating unit 18 and a reliability database 19. In the third embodiment, the communication device 11 may be regarded as the above-mentioned receiving means of the receiver, and the region determining unit 13 and communication device 11 may be regarded as the above-mentioned region request transmitting means, while the obstacle detection sensor 15 may be regarded as the above-mentioned receiving-side vicinity information obtaining means, and the reliability estimating unit 18 and reliability database 19 may be regarded as received information determining unit.

The communication device 11, own-vehicle-position specifying unit 12, region determining unit 13 and the alarm, control and display device 14 are similar in construction to those of the first embodiment, and therefore will not be described herein. The obstacle detection sensor 15 is similar in construction to the obstacle detection sensor 15 of the receiver 10B of the second embodiment, and therefore will not be described herein. The obstacle detection sensors 15, 22 are adapted to provide obstacle information for identifying each obstacle, other than the position of the obstacle. The obstacle information may include, for example, the size and shape of the obstacle, and the intensity of reflection of laser light against the obstacle.

The reliability database 19 is formed in a certain region of RAM. If there are two or more vehicles V2, the total number Nd of obstacles detected, the number Ne of obstacles erroneously detected, the number Nm of obstacles that fail to be detected, the sum Esum of errors, the number of times $T_{2,\ m}$ that information on each obstacle is received, obstacle information $I_{2,\ m}$, obstacle position $^{W}O_{2,\ m}$ and other information are stored in the reliability database 19, with respect to each of other vehicles V2 that transmit obstacle information. The reliability database 19 may be possessed by each of the vehicles concerned, or may be shared with other vehicles. The database can be constructed efficiently if it is shared between or among two or more vehicles.

When the reliability database 19 is systematically managed over the entire road environment, the types of information shared by two or more vehicles may be selected for more efficient sharing of the database 19. For example, some items of information, such as the total number Nd of obstacles detected, the number Ne of obstacles erroneously detected, the number Nm of obstacles that fail to be detected, and the sum Esum of errors, which are less likely to depend on particular time and location, may be selected and shared among the vehicles. The database can be constructed efficiently if it is shared in this manner.

The total number Nd of obstacles detected, which will be simply called "total detection number Nd", is the number of obstacles that can be sensed by both the own vehicle V1 and the other vehicle V2. The number Ne of obstacles erroneously detected, which will be simply called "erroneous detection number Ne", is the number of obstacles that are sensed by the other vehicle V2 but not sensed by the own vehicle V1. The number Nm of obstacles that fail to be detected, which will be simply called "failed detection number Nm", is the number of obstacles that are sensed by the own vehicle V1 but cannot be sensed by the other vehicle V2. The sum Esum of errors is the sum of the distances between the positions of obstacles sensed by the other vehicle V2 and the positions of corresponding obstacles sensed by the own vehicle V1 when the other vehicle V2 can sense one or more obstacles sensed by the own vehicle V1. The number of times $T_{2,\ m}$ that the information on a certain obstacle is received, which will be simply called "the number of times of receiving $T_{2,\ m}$, is the number of times the information on the same obstacle is received from the other vehicle V2.

An erroneous detection rate $Rate_{FP}$ is calculated according to the expression (13) as indicated below, using the total detection number Nd, erroneous detection number Ne and the failed detection number Nm. The larger the value of the erroneous detection rate $Rate_{FP}$, the more frequently detection errors occur in the vehicle V2. A failed detection rate $Rate_{TP}$ is calculated according to the expression (14) as indicated below, using the total detection number Nd and the failed detection number Nm. The larger the value of the failed detection rate $Rate_{TP}$, the more frequently detection failures occur in the vehicle V2. The error $E_{pos}$ is calculated according to the expression (15) as indicated below, using the total detection number Nd and the sum Esum of the errors. The larger the value of the error $E_{pos}$, the poorer accuracy with which the vehicle V2 senses obstacles.

$$Rate_{FP} = \frac{Ne}{Nd + Nm} \tag{13}$$

$$Rate_{TP} = \frac{Nm}{Nd + Nm} \tag{14}$$

$$E_{pos} = \frac{Esum}{Nd} \tag{15}$$

The reliability estimating unit 18 compares the obstacle information on obstacles detected by the obstacle detection sensor 15 with the obstacle information obtained from the other vehicle V2, and sets the total detection number Nd, erroneous detection number Ne, failed detection number Nm and the sum Esum of errors, based on the result of comparison. Then, the reliability estimating unit 18 updates the reliability database 19 by using the newly set values. While the comprehensive judgment unit 16 of the second embodiment cannot evaluate the correctness of obstacle information unless the same obstacle is sensed by the vehicle V1 and the vehicle V2 at the same time, evaluations can be made in the process performed by the reliability estimating unit 18 even if the same obstacle cannot be sensed by the vehicle V1 and the vehicle V2 at the same time. For example, evaluations can be made if an obstacle that was hidden by another object and could not be sensed can be sensed after traveling of the vehicle.

More specifically, each time the communication device 11 obtains obstacle information on a certain obstacle as received data (each time the communication device 11 receives obstacle information from the other vehicle V2), the reliability estimating unit 18 extracts the obstacle position ${}^{W}O_{2,\ m}$ and obstacle information $I_{2,\ m}$ from the obtained obstacle information. The obstacle information $I_{2,\ m}$ is information that can identify the obstacle, and includes, for example, the size and shape of the obstacle and the intensity of reflection of laser light against the obstacle. The reliability estimating unit 18 determines whether the obstacle information $I_{2,\ m}$ received this time is stored in the reliability database 19. If it is not stored in the reliability database 19 (namely, the vehicle V2 detects the obstacle for the first time), the reliability estimating unit 18 stores the obstacle position ${}^{W}O_{2,\ m}$ and obstacle information $I_{2,\ m}$ of the newly detected obstacle in the reliability database 19. If, on the other hand, the obstacle information $I_{2,\ m}$ received this time is stored in the reliability database 19 (namely, the same obstacle was detected by the vehicle V2 in the past), the reliability estimating unit 18 increments the number of times of receiving $T_{2,\ m}$ for the obstacle in question, and updates the obstacle position ${}^{W}O_{2,\ m}$.

The reliability estimating unit 18 selects an obstacle (obstacle position ${}^{1}P'_{1,\ n}$) whose distance from the designated region ${}^{1}R_{n}$ is equal to or smaller than a threshold value $TH_{d}$ (the obstacle is located in the vicinity of the designated region ${}^{1}R_{n}$) and which was not detected the last time (at a previous point t−1 in time), from the obstacles detected this time (at the current time t) by the obstacle detection sensor 15. Namely, only the obstacle(s) that can be newly detected this time is/are subjected to evaluation so that the amount of data processed is reduced. Then, the reliability estimating unit 18 converts the obstacle position ${}^{1}P'_{1,\ n}$ of the selected obstacle on the relative coordinate system into an obstacle position ${}^{W}P'_{1,\ n}$ on the absolute coordinate system.

Then, the reliability estimating unit 18 determines whether the obstacles sensed by the other vehicle V2 include any obstacle with regard to which the distance d between the obstacle position ${}^{W}O_{2,\ m}$ sensed by the vehicle V2 and the obstacle position ${}^{W}P'_{1,\ n}$ sensed by the own vehicle V1 is within the positional errors $P_{err}$. If the obstacles sensed by the vehicle V2 do not include any obstacle sensed by the own vehicle V1, the reliability estimating unit 18 increments the failed detection number Nm of the reliability database 19.

If, on the other hand, the obstacles sensed by the vehicle V2 include one or more obstacles with regard to which the distance d between the two points is within the positional errors $P_{err}$, the reliability estimating unit 18 selects an obstacle having the smallest distance $d_{min}$. Then, the reliability estimating unit 18 eliminates the obstacle position ${}^{W}O_{2,\ mmin}$, obstacle information $I_{2,\ mmin}$ and the number of times of receiving $T_{2,\ mmin}$ of the obstacle having the smallest distance $d_{min}$, from the reliability database 19. Namely, since it was found that the same obstacle is sensed by the own vehicle V1 and the other vehicle V2, the information on this obstacle need not be compared for subsequent evaluations, and corresponding data is eliminated from the reliability database 19. Furthermore, the reliability estimating unit 18 adds the smallest distance $d_{min}$ to the sum Esum of errors of the reliability database 19, and increments the total detection number Nd. The reliability estimating unit 18 performs this process with respect to each of the $N_{obj}$-pieces of obstacles sensed by the own vehicle V1.

Once the above-described process is performed on all of the $N_{obj}$-pieces of obstacles sensed by the own vehicle V1, the reliability estimating unit 18 determines whether the reliability database 19 contains any obstacle for which the number of times of receiving $T_{2,m}$ is larger than a threshold value $TH_{max}$. Namely, it is determined whether there is any obstacle that is not sensed by the own vehicle V1 but was sensed a certain number of times in the past by the other vehicle V2. If the reliability database 19 contains any obstacle for which the number of times of receiving $T_{2,m}$ is larger than the threshold value $TH_{max}$, evaluations cannot be made on the obstacle, and therefore the reliability estimating unit 18 eliminates the obstacle position $^{W}O_{2,m}$, obstacle information $I_{2,m}$ and the number of times of receiving $T_{2,m}$ of the obstacle from the reliability database 19. Furthermore, the reliability estimating unit 18 increments the erroneous detection number Ne of the reliability database 19.

The reliability estimating unit 18 performs the above-described process with respect to all of the vehicles V2 that transmit obstacle information to the vehicle V1, and updates information stored in the reliability database 19 for each of the vehicles V2.

When there are two or more vehicles V2 that transmit obstacle information to the vehicle V1, the obstacle information determining unit 17 determines whether the obstacle information received from each of the vehicles V2 can be used, based on the sensing reliability of the vehicle V2. More specifically, the obstacle information determining unit 17 retrieves the total detection number Nd, erroneous detection number Ne, failed detection number Nm and the sum Esum of errors with respect to each of the vehicles V2 from the reliability database 19. Then, the obstacle information determining unit 17 calculates the erroneous detection rate $Rate_{FP}$ according to the above-indicated expression (13), calculates the failed detection rate $Rate_{TP}$ according to the above-indicated expression (14), and calculates the error $E_{pos}$ according to the above-indicated expression (15). Then, the obstacle information determining unit 17 determines whether the erroneous detection rate $Rate_{FP}$ is equal to or smaller than a threshold value $TH_e$, whether the failed detection rate $Rate_{TP}$ is equal to or smaller than a threshold value $TH_m$, and whether the error $E_{pos}$ is equal to or smaller than a threshold value $TH_E$. The threshold values $TH_e$, threshold value $TH_m$ and the error $E_{pos}$ are set in advance by experiment, or the like.

If the erroneous detection rate $Rate_{FP}$ is equal to or smaller than the threshold value $TH_e$, and the failed detection rate $Rate_{TP}$ is equal to or smaller than the threshold value $TH_m$, while the error $E_{pos}$ is equal to or smaller than the threshold value $TH_E$, the obstacle information determining unit 17 determines that the sensing reliability of the vehicle V2 is high, and uses obstacle information obtained from the vehicle V2. If the erroneous detection rate $Rate_{FP}$ is larger than the threshold value $TH_e$, or the failed detection rate $Rate_{TP}$ is larger than the threshold value $TH_m$, or the error $E_{pos}$ is larger than the threshold value $TH_E$, the obstacle information determining unit 17 determines that the sensing reliability of the vehicle V2 is low, sets an error flag for the vehicle V2, and does not use obstacle information obtained from the vehicle V2. When the failed detection rate $Rate_{TP}$ is larger than the threshold value $TH_m$ (the sensing region of the vehicle V2 is outside the vision of the vehicle V1), in particular, the obstacle information determining unit 17 determines that the vehicle V2 cannot sense obstacles in a region for which obstacle information is needed by the vehicle V1, and sets a failed detection flag for the vehicle V2.

The alarm, control and display device 14 produces alarm output and display output and performs intervention control, using obstacle information from the vehicle V2 having a high sensing reliability (i.e., from the vehicle V2 for which no error flag is set) and obstacle information detected by the own vehicle V1.

The error detection rate $Rate_{FP}$, failed detection rate $Rate_{TP}$ and the error $E_{pos}$ may be outputted to the alarm, control and display device 14, and the alarm, control and display device 14 may produce alarm output and display output and perform intervention control, according to the erroneous detection rate $Rate_{FP}$, failed detection rate $Rate_{TP}$ and the magnitude of the error $E_{pos}$. Also, other criteria, such as the total operating time of sensors, may be provided in addition to or in place of the above-indicated criteria of judgment on the reliability.

Figure 14A:
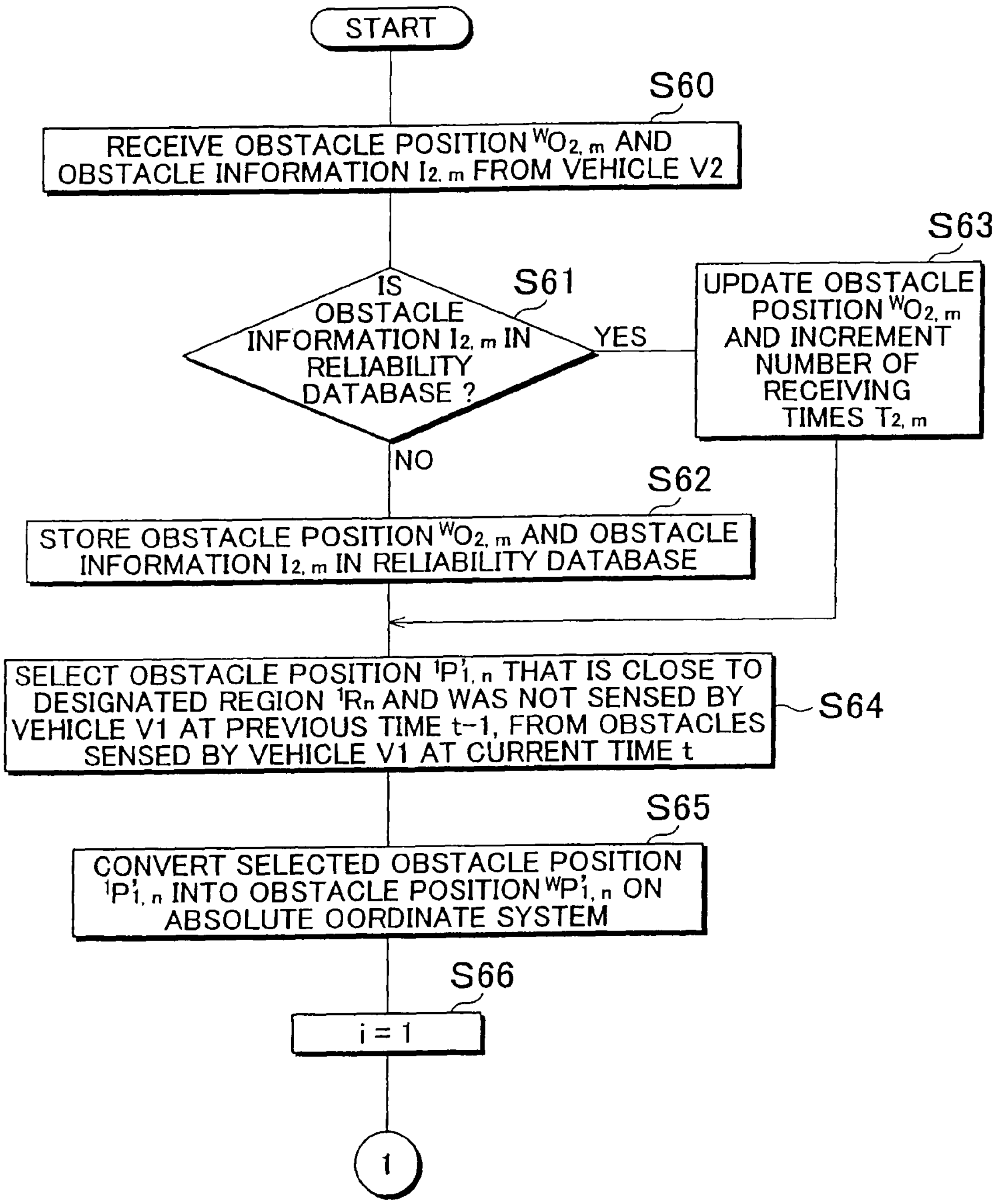
FIGS. 14A and 14B are a flowchart illustrating the flow of a process performed by a reliability estimating unit of FIG. 13.
Figure 14B:
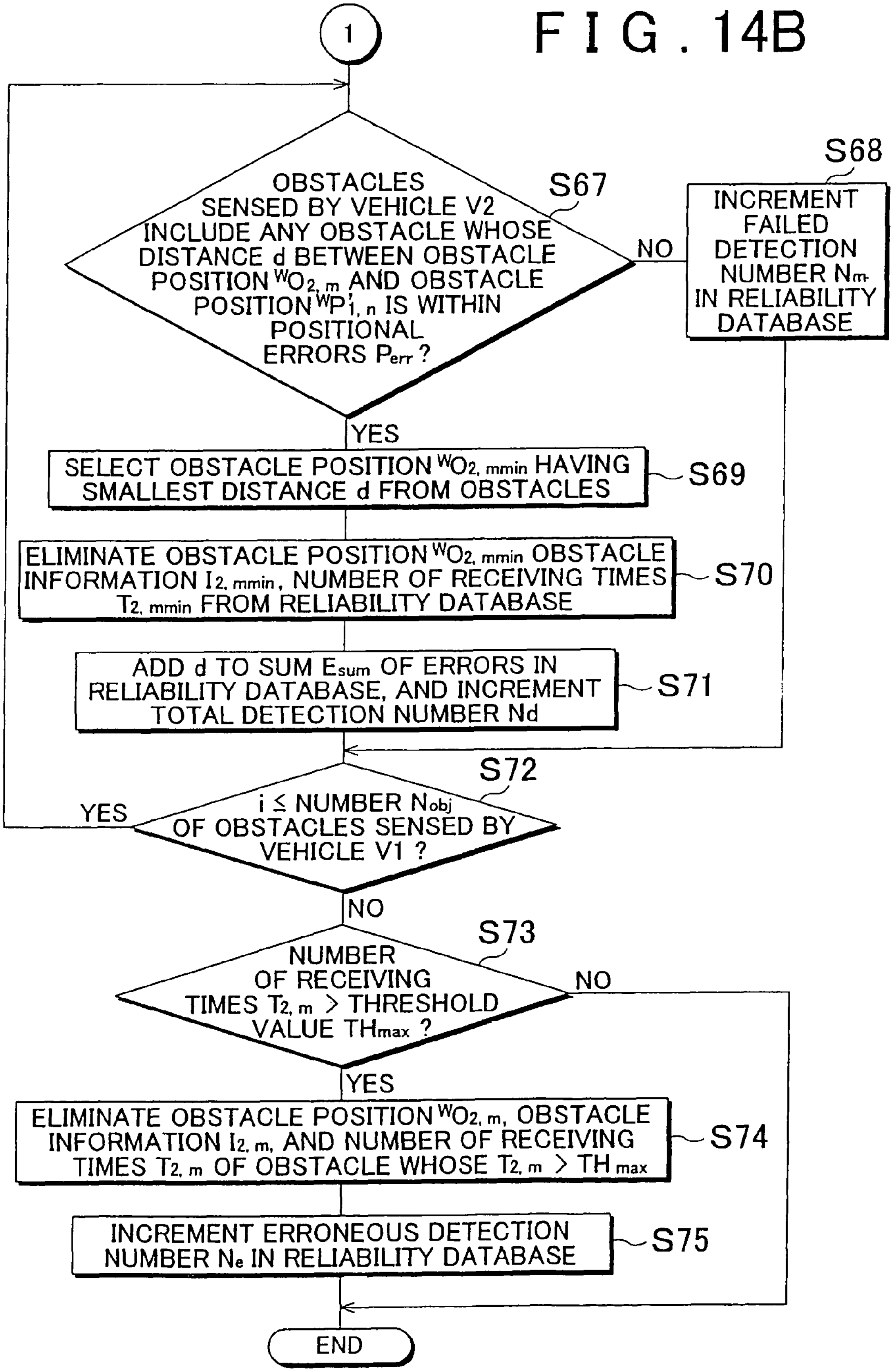

Referring to FIG. 1, FIG. 13 and FIGS. 14A and 14B, the operation of the road condition detecting system of the third embodiment will be explained. In the road condition detecting system of the third embodiment, the receiver 10C performs an additional process, as compared with the road condition detecting system of the first embodiment, and therefore the additional process or operation will be described in detail. In particular, a process performed by the reliability estimating unit 18 of the receiver 10C will be described with reference to the flowchart of FIGS. 14A and 14B. The flowchart of FIGS. 14A and 14B illustrates the control flow of the reliability estimating unit 18 of FIG. 13. The system may include at least one receiver 10C of one or more receiving-side vehicles V1 and at least one transmitter 20C of one or more sending-side vehicles V2, and the receiver(s) 10C and the transmitter(s) 20C repeatedly perform the following operation.

In the receiver 10C of the receiving-side vehicle V1, the obstacle detection sensor 15 detects obstacles in the vicinity of the vehicle V1 at given time intervals. If any obstacle exists, the receiver 10C calculates the obstacle position $^{1}P_{1,n}$ of the obstacle relative to the vehicle V1, and obtains the obstacle information $I_{1,n}$. Similarly, in the transmitter 20C of the sending-side the vehicle V2, the obstacle detection sensor 22 detects obstacles in the vicinity of the vehicle V2 at given time intervals. If any obstacle exists, the transmitter 20C calculates the obstacle position $^{2}O_{2,m}$ relative to the vehicle V2, and obtains the obstacle information $I_{2,m}$.

In the receiver 10C of the receiving-side vehicle V1, the communication device 11 receives information (obstacle position $^{W}O_{2,m}$, obstacle information $I_{2,m}$) on the obstacles sensed by the other vehicle V2 at given time intervals (S60). For each of the obstacles on which information is received, the receiver 10C determines whether the reliability database 19 contains obstacle information $I_{2,m}$ on the obstacle concerned (S61). If it is determined in step S61 that the obstacle information $I_{2,m}$ is not contained in the reliability database 19, the receiver 10C stores the obstacle position $^{W}O_{2,m}$ and obstacle information $I_{2,m}$ of the newly detected obstacle in the reliability database 19 (S62). If, on the other hand, it is determined in step S61 that the obstacle information $I_{2,m}$ is contained in the reliability database 19, the receiver 10C updates the obstacle position $^{W}O_{2,m}$ of the obstacle concerned, and increments the number of times of receiving $T_{2,m}$ with respect to the obstacle (S63).

In the next step, the receiver 10C selects the obstacle position $^{1}P'_{1,n}$ of an obstacle that is located in the vicinity of the designated region ${}^{1}R_n$ and was not sensed at a previous point t−1 in time, from the obstacle(s) sensed by the own vehicle V1 at the current time t (S64). Then, the receiver 10C converts the obstacle position of the selected obstacle on the relative coordinate system into the obstacle position ${}^{W}P'_{1,n}$ on the absolute coordinate system (S65).

Subsequently, the receiver 10C sets 1 to i (S66). Then, the receiver 10C determines whether the obstacles sensed by the other vehicle V2 include any obstacle with respect to which the distance between the obstacle position ${}^{W}O_{2,m}$ sensed by the vehicle V2 and the obstacle position ${}^{W}P'_{1,n}$ sensed by the own vehicle V1 is within the positional errors $P_{err}$ (S67). If it is determined in step S67 that the obstacles sensed by the other vehicle V2 does not include any obstacle with respect to which the distance d between the two points is within the positional errors $P_{err}$, the receiver 10C increments the failed detection number Nm of the reliability database 19, and finishes the process on the obstacle position ${}^{W}P'_{1,n}$ of the obstacle sensed by the own vehicle V1 (S68).

If it is determined in step S67 that the obstacles sensed by the other vehicle V2 include one or more obstacles with respect to which the distance d between the two points is within the positional errors $P_{err}$, the receiver 10C selects the obstacle position ${}^{W}O_{2,mmin}$ of an obstacle having the smallest distance d, from the above-mentioned one or more obstacles (S69). Then, the receiver 10*e* eliminates the obstacle position ${}^{W}O_{2,mmin}$, obstacle information $I_{2,mmin}$ and the number of times of receiving $T_{2,mmin}$ of the obstacle having the smallest distance d, from the reliability database 19 (S70). Furthermore, the receiver 10C adds the smallest distance d to the sum Esum of errors stored in the reliability-database 19, and increments the total number Nd of obstacles detected (S71).

Then, the receiver 10C determines whether i is equal to or smaller than the number $N_{obj}$ of obstacles sensed by the own vehicle V1 (S72). If it is determined in step S72 that i is equal to or smaller than the number $N_{obj}$ of the obstacles, the receiver 10C adds 1 to i, and proceeds to the process on the obstacle position ${}^{W}P'_{1,n+1}$ of the next obstacle sensed by the own vehicle.

If, on the other hand, it is determined in step S72 that i is larger than the number $N_{obj}$ of the obstacles, the receiver 10C determines whether the reliability database 19 contains any obstacle with respect to which the number of times of receiving $T_{2,m}$ is larger than the threshold value $TH_{max}$ (S73). If it is determined in step S73 that the reliability database 19 contains an obstacle with respect to which the number of times of receiving $T_{2,m}$ is larger than the threshold value $TH_{max}$, the receiver 10C eliminates the obstacle position ${}^{W}O_{2,m}$, obstacle information $I_{2,m}$ and the number of times of receiving $T_{2,m}$ of the obstacle from the reliability database 19 (S74), and increments the erroneous detection number Ne stored in the reliability database 19 (S75).

If there are two or more vehicles V2 in the system, the receiver 10C performs the process of steps S60 through S75 with respect to each of all the vehicles V2 that transmit obstacle information to the vehicle V1.

Next, the receiver 10C retrieves the total detection number Nd, erroneous detection number Ne, failed detection number Nm and the sum Esum of errors of the vehicle V2 from the reliability database 19, for each of the vehicles V2 that transmit obstacle information to the vehicle V1. Then, the receiver 10C calculates the erroneous detection rate $Rate_{FP}$ from the total detection number Nd, erroneous detection number Ne and the failed detection number Nm, calculates the failed detection rate $Rate_{TP}$ from the total detection number Nd and the failed detection number Nm, and calculates the error $E_{pos}$ from the total detection number Nd and the sum Esum of errors.

Furthermore, the receiver 10C determines whether the erroneous detection rate $Rate_{FP}$ is equal to or smaller than the threshold value $TH_e$, whether the failed detection rate $Rate_{TP}$ is equal to or smaller than the threshold value $TH_m$, and whether the error $E_{pos}$ is equal to or smaller than the threshold value $TH_E$. If the erroneous detection rate $Rate_{FP}$ is equal to or smaller than the threshold value $TH_e$, and the failed detection rate $Rate_{TP}$ is equal to or smaller than the threshold value $TH_m$, while the error $E_{pos}$ is equal to or smaller than the threshold value $TH_E$, the receiver 10C determines that the sensing reliability of the vehicle V2 is high. If, on the other hand, the erroneous detection rate $Rate_{FP}$ is larger than the threshold value $TH_e$, or the failed detection rate $Rate_{TP}$ is larger than the threshold value $TH_m$, or the error $E_{pos}$ is larger than the threshold value $TH_E$, the receiver 10C determines that the sensing reliability of the vehicle V2 is low, and sets an error flag for the vehicle V2. If the failed detection rate $Rate_{TP}$ is larger than the threshold value $TH_m$, the receiver 10C sets a failed detection flag for the vehicle V2.

Then, the receiver 10C produces alarm output and display output and performs intervention control in substantially the same manner as in the first embodiment, based on the obstacle information received from the vehicle(s) V2 for which no error flag is set, and obstacle information detected by the own vehicle V1.

The road condition detecting system of the third embodiment provides the following effects, in addition to the same effects as those provided by the road condition detecting system of the first embodiment. The road condition detecting system of the third embodiment estimates or evaluates the sensing reliability of the sending-side vehicle V2, by using obstacle information sensed by itself, i.e., by the receiving-side vehicle V1, and abandons the obstacle information from the vehicle V2 if its reliability is low. Thus, the system can prevent the receiving-side vehicle from employing erroneous obstacle information from the sending-side vehicle, and is thus able to operate more robustly. In particular, the road condition detecting system of the third embodiment is able to estimate or evaluate the reliability even if the same obstacle is sensed at the same time by the receiving-side vehicle V1 and the sending-side vehicle V2, thus assuring improved accuracy with which the reliability is estimated.

While some embodiments of the invention have been illustrated above, it is to be understood that the invention is not limited to details of these embodiments, but may be embodied in various other forms.

In the road condition detecting systems of the illustrated embodiments, information about obstacles, such as other vehicles (two-wheel vehicles, four-wheel vehicle), bicycles and pedestrians, is transmitted and received as information on road conditions, and production of alarm output and display output and intervention control are performed based on the obstacle information. However, the information on road conditions may include information about the road on which the vehicle is running or adjacent roads, or information about various road-related conditions, such as objects on or in the vicinity of the relevant road. For example, the road-related information may include information about stationary objects, such as buildings, in the vicinity of the road (the objects may be detected on images), or objects dropped on the road (which may be detected on images), information on construction or work operations, information on weather conditions of a region around the road (which may be obtained by means of a rain drop sensor or a lux meter), traffic jam information (based on the VICS or the vehicle speed), and information on road signs, road shape and the road surface. It is also possible to provide the road-condition information, such as obstacle information, to other systems, such as a shock absorption system or a passenger protection system.

While the communications between the receiver(s) and the transmitter(s) are in the form of vehicle-to-vehicle communications in the illustrated embodiments, the system of the invention may use communications between one or more vehicles and roadside devices (such as surveillance cameras or beacons of VICS), pedestrians and/or bicycles.

In the illustrated embodiments, the transmitter is arranged to determine the obstacle information to be transmitted, based on the designated region transmitted from the receiver. However, the transmitter may include a means for obtaining a sending-side sensing region in which obstacles can be detected by the sending-side vehicle and a receiving-side sensing region in which obstacles can be detected by the receiving-side vehicle, and may determine obstacle information on obstacles in a region that is included in the sending-side sensing region but not included in the receiving-side sensing region, as information to be transmitted. In another example, the transmitter may determine information to be transmitted, based on information on the position of the receiver detected by the obstacle detection sensor.

In the illustrated embodiments, the reliability of the information on obstacles sensed by the other vehicle is evaluated, and the obstacle information sensed by the other vehicle is not used when the reliability is low. However, the reliability of the obstacle information sensed by the own vehicle and the reliability of the obstacle information sensed by the other vehicle may be respectively evaluated, and the obstacle information having the higher reliability may be used.

When the amount of information (amount of data) regarding the designated region for which obstacle information is required is smaller than the maximum amount of information (data) that can be transmitted, all of the information may be transmitted. When the amount of the information regarding the designated region exceeds the maximum amount of transmittable information, the result of sensing of the own vehicle may be compared with the result of sensing of the other vehicle, which is transmitted from the other vehicle, and the sensing result of the other vehicle having the lower reliability may be replaced with the sensing result of the own vehicle if the sensing result of the own vehicle has the higher reliability. In this manner, even in the case where a large number of vehicles exist which transmit sensing information, the amount of data communicated can be kept constant. To perform this process, the transmitter may be provided with a processing unit that manages the amount of data to be transmitted, between the information transmission determining unit and the communication device.

The invention claimed is:

1. A road condition detecting system comprising:

a transmitter provided in a sending-side object on a road and adapted to transmit information about road conditions; and a receiver provided in a receiving-side object on the road and adapted to receive information about the road conditions, wherein:

the transmitter includes a sending-side vicinity information obtaining unit that obtains information about the vicinity of the sending-side object, a transmitted information determining unit that determines information to be transmitted, from the vicinity information obtained by the sending-side vicinity information obtaining unit, and a transmitting unit that transmits the vicinity information determined by the transmitted information determining unit, the receiver includes:

a receiving unit that receives the vicinity information transmitted from the transmitting unit of the transmitter, a receiving-side vicinity information obtaining unit that obtains information about the vicinity of the receiving-side object, a reliability obtaining unit that respectively obtains the reliability of the information about the vicinity of the receiving-side object which is obtained by the receiving-side vicinity information obtaining unit and the reliability of information about the vicinity of the sending-side object which the receiving unit receives, and a received information determining unit that determines whether the information about the vicinity of the sending-side object which the receiving unit receives is to be employed, wherein the received information determining unit compares the reliability of the information about the vicinity of the receiving-side object, which is obtained by the reliability obtaining unit, with the reliability of the information about the vicinity of the sending-side object, which is obtained by the reliability obtaining unit, and employs the vicinity information having the higher reliability, the transmitted information determining unit includes a receiving-side information obtaining unit that obtains information about the receiving-side object, and determines the information to be transmitted, based on the information about the receiving-side object, and the receiving-side information obtaining unit obtains the information about the receiving-side object which is calculated based on the vicinity information obtained by the sending-side vicinity information obtaining unit.

2. The road condition detecting system according to claim 1, wherein the transmitted information determining unit calculates the relative positions between the sending-side object and the receiving-side object, based on the vicinity information obtained by the sending-side vicinity information obtaining unit and the position of the receiving-side object which is specified by the receiving-side information obtaining unit.

3. The road condition detecting system according to claim 1, wherein:

the receiver includes a region request transmitting unit that transmits a region request that designates a region on which information is needed; and the receiving-side information obtaining unit obtains the information about the receiving-side object from the region request transmitted from the region request transmitting unit.

4. The road condition detecting system according to claim 3, wherein the region request transmitting unit designates the region on which information is needed, based on the position of the receiving-side object derived from the relative positions calculated by the transmitted information determining unit.

5. The road condition detecting system according to claim 3, wherein the transmitted information determining unit determines the information to be transmitted, based on the designated region on which information is needed.

6. The road condition detecting system according to claim 1, wherein:

the transmitter includes a first region obtaining unit that obtains a first region on which information can be obtained by the transmitter, and a second region obtaining unit that obtains a second region on which information can be obtained by the receiver; and the transmitted information determining unit determines vicinity information on a region that is included in the first region on which information can be obtained by the transmitter but not included in the second region on which information can be obtained by the receiver, as the information to be transmitted.

7. The road condition detecting system according to claim 1, wherein:

the receiver includes a receiving-side vicinity information obtaining unit that obtains information about the vicinity of the receiving-side object, and a received information determining unit that determines whether information about the vicinity of the sending-side object which the receiver receives is employed; and if a degree of discrepancy between given information included in the information about the vicinity of the receiving-side object which is obtained by the receiving-side vicinity information obtaining unit and given information included in the information about the vicinity of the sending-side object which the receiving unit receives is equal to or larger than a threshold value, the received information determining unit abandons the given information received by the receiving unit.

8. The road condition detecting system according to claim 1, wherein the information about the receiving-side object comprises a region request that designates a region on which information is needed by the receiving-side object.

9. The road condition detecting system according to claim 1, wherein both of the sending-side object and the receiving-side object are vehicles.

10. A road condition detecting system comprising:

a transmitter provided in a sending-side object on a road and adapted to transmit information about road conditions; and a receiver provided in a receiving-side object on the road and adapted to receive information about the road conditions, wherein:

the transmitter includes:

a sending-side vicinity information obtaining unit that obtains information about the vicinity of the sending-side object, a transmitted information determining unit that determines information to be transmitted, from the vicinity information obtained by the sending-side vicinity information obtaining unit, and a transmitting unit that transmits the vicinity information determined by the transmitted information determining unit;

the receiver includes:

a receiving unit that receives the vicinity information transmitted from the transmitting unit of the transmitter, and a receiving-side vicinity information obtaining unit that obtains information about the vicinity of the receiving-side object, and a received information determining unit that determines whether information about the vicinity of the sending-side object which the receiver receives is employed, wherein if a degree of discrepancy between given information included in the information about the vicinity of the receiving-side object which is obtained by the receiving-side vicinity information obtaining unit and given information included in the information about the vicinity of the sending-side object which the receiving unit receives is equal to or larger than a threshold value, the received information determining unit abandons the given information received by the receiving unit, the transmitted information determining unit includes a receiving-side information obtaining unit that obtains information about the receiving-side object, and determines the information to be transmitted, based on the information about the receiving-side object; and the receiving-side information obtaining unit obtains the information about the receiving-side object which is calculated based on the vicinity information obtained by the sending-side vicinity information obtaining unit.

11. The road condition detecting system according to claim 10, wherein the transmitted information determining unit calculates the relative positions between the sending-side object and the receiving-side object, based on the vicinity information obtained by the sending-side vicinity information obtaining unit and the position of the receiving-side object which is specified by the receiving-side information obtaining unit.

12. The road condition detecting system according to claim 10, wherein:

the receiver includes a region request transmitting unit that transmits a region request that designates a region on which information is needed; and the receiving-side information obtaining unit obtains the information about the receiving-side object from the region request transmitted from the region request transmitting unit.

13. The road condition detecting system according to claim 12, wherein the region request transmitting unit designates the region on which information is needed, based on the position of the receiving-side object derived from the relative positions calculated by the transmitted information determining unit.

14. The road condition detecting system according to claim 12, wherein the transmitted information determining unit determines the information to be transmitted, based on the designated region on which information is needed.

15. The road condition detecting system according to claim 10, wherein:

the transmitter includes a first region obtaining unit that obtains a first region on which information can be obtained by the transmitter, and a second region obtaining unit that obtains a second region on which information can be obtained by the receiver; and the transmitted information determining unit determines vicinity information on a region that is included in the first region on which information can be obtained by the transmitter but not included in the second region on which information can be obtained by the receiver, as the information to be transmitted.

16. A road condition detecting system comprising:

a transmitter provided in a sending-side object on a road and adapted to transmit information about road conditions; and a receiver provided in a receiving-side object on the road and adapted to receive information about the road conditions, wherein:

the transmitter includes:

a sending-side vicinity information obtaining unit that obtains information about the vicinity of the sending-side object, a transmitted information determining unit that determines information to be transmitted, from the vicinity information obtained by the sending-side vicinity information obtaining unit, a transmitting unit that transmits the vicinity information determined by the transmitted information determining unit, a first region obtaining unit that obtains a first region on which information can be obtained by the transmitter, and a second region obtaining unit that obtains a second region on which information can be obtained by the receiver;

the receiver includes a receiving unit that receives the vicinity information transmitted from the transmitting unit of the transmitter;

the transmitted information determining unit includes a receiving-side information obtaining unit that obtains information about the receiving-side object, and determines: (1) the information to be transmitted, based on the information about the receiving-side object, and (2) vicinity information on a region that is included in the first region on which information can be obtained by the transmitter but not included in the second region on which information can be obtained by the receiver, as the information to be transmitted; and the receiving-side information obtaining unit obtains the information about the receiving-side object which is calculated based on the vicinity information obtained by the sending-side vicinity information obtaining unit.

17. The road condition detecting system according to claim 16, wherein the transmitted information determining unit calculates the relative positions between the sending-side object and the receiving-side object, based on the vicinity information obtained by the sending-side vicinity information obtaining unit and the position of the receiving-side object which is specified by the receiving-side information obtaining unit.

18. The road condition detecting system according to claim 16, wherein:

the receiver includes a region request transmitting unit that transmits a region request that designates a region on which information is needed; and the receiving-side information obtaining unit obtains the information about the receiving-side object from the region request transmitted from the region request transmitting unit.

19. The road condition detecting system according to claim 18, wherein the region request transmitting unit designates the region on which information is needed, based on the position of the receiving-side object derived from the relative positions calculated by the transmitted information determining unit.

20. The road condition detecting system according to claim 18, wherein the transmitted information determining unit determines the information to be transmitted, based on the designated region on which information is needed.

* * * * *